US008346513B2

(12) United States Patent
Okada et al.

(10) Patent No.: US 8,346,513 B2
(45) Date of Patent: Jan. 1, 2013

(54) THREE-DIMENSIONAL DATA GENERATION DEVICE, METHOD AND PROGRAM THEREOF

(75) Inventors: Yuuki Okada, Kawasaki (JP); Shingo Fujii, Yokohama (JP); Hiroki Yabu, Yokohama (JP); Osamu Furukawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 568 days.

(21) Appl. No.: 12/575,203

(22) Filed: Oct. 7, 2009

(65) Prior Publication Data

US 2010/0094598 A1    Apr. 15, 2010

(30) Foreign Application Priority Data

Oct. 9, 2008 (JP) .................................. 2008-263277

(51) Int. Cl.
*G06F 17/50* (2006.01)
(52) U.S. Cl. .......................................................... 703/1
(58) Field of Classification Search .................... 703/1, 6
See application file for complete search history.

(56) References Cited

U.S. PATENT DOCUMENTS

| 5,740,341 A * | 4/1998 | Oota et al. ............... 345/420 |
| 2003/0061011 A1 * | 3/2003 | Hoeft ............................... 703/1 |
| 2006/0052989 A1 | 3/2006 | Berwanger |

FOREIGN PATENT DOCUMENTS

| EP | 0 626 652 A1 | 11/1994 |
| JP | 04-010070 A | 1/1992 |
| JP | 06-309418 A | 11/1994 |
| JP | 08-050606 A | 2/1996 |
| JP | 10-154165 A | 6/1998 |
| JP | 2002-007485 A | 1/2002 |
| JP | 2004-013838 A | 1/2004 |
| JP | 2006-331177 A | 12/2006 |

OTHER PUBLICATIONS

"4H-FRAP Raumliche Stabtragwerke Beispieleingaben", Nov. 10, 2005, XP55001865, pp. 1-52.
"FRILO-Software-Programmubersicht", Jan. 1, 2004, XP55001893, pp. 1-42.
R. Guirardello et al., "Optimization of process plant layout with pipe routing", Computers & Chemical Engineering, Pergamon Press, vol. 30, No. 1, Nov. 15, 2005, pp. 99-114.

* cited by examiner

*Primary Examiner* — Dwin M Craig
*Assistant Examiner* — Bernard E Cothran
(74) *Attorney, Agent, or Firm* — Foley & Lardner LLP

(57) ABSTRACT

In three-dimensional data generation unit 120, data edition unit 122, generates a spreadsheet data that includes information relating to a plurality of node points on a continuous arrangement route of target components by interactive process with a user, and stores the data in storage unit 130. Three-dimensional data conversion unit 123, on the basis of spreadsheet data, arranges the node points in a three-dimensional space, connects node points having a predetermined relationship using line segments, and imparts cross-sectional shapes to the connected line segments, to carry out thereby conversion into target component arrangement three-dimensional data. Three-dimensional data management unit 124 stores the obtained target component arrangement three-dimensional data in storage unit 130, in a format readable by three-dimensional CAD or three-dimensional review system, and outputs the data in response to an output instruction from interface unit 110.

14 Claims, 14 Drawing Sheets

FIG. 8

| | Name | Cross Section | Size | Status | Position | Component | Face-to-face | ABS | X | Y | Z | Connection |
|---|---|---|---|---|---|---|---|---|---|---|---|---|
| 801 | steam pipe | circular | 200A | starting point | center | | | O | 1000 | 1000 | 1000 | |
| 802 | | | | | | | | | - | - | 350 | 1 |
| 803 | | | | | | | | | - | - | 500 | |
| 804 | | | | | | valve | 300 | | 400 | - | - | |
| 805 | | | | | | | | O | 350 | - | - | 2 |
| 806 | | | | | | | | | 2150 | 1000 | 1850 | |
| 807 | | | | | | | | | - | - | 500 | |
| 808 | | | 25A | branching point | | | | | - | - | - | 1 |
| 809 | | | | | | | | | - | 500 | - | |
| 810 | | | NPS1" | branching point | | | | O | 1750 | 1000 | 1850 | 2 |
| 811 | | | | | | | | | - | -500 | - | |

FIG. 12

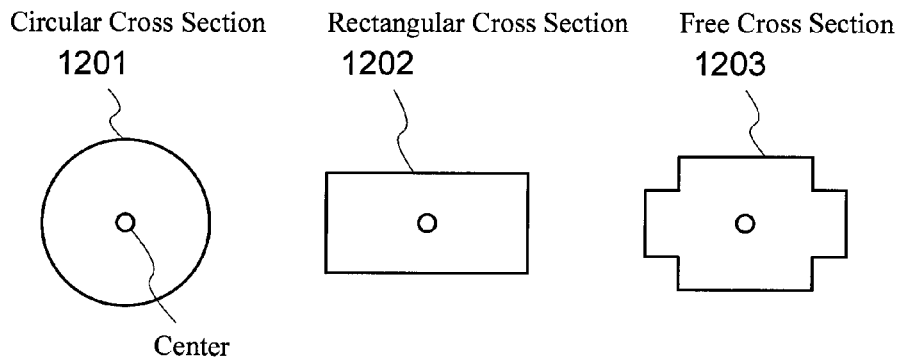

Circular Cross Section 1201

Rectangular Cross Section 1202

Free Cross Section 1203

Center

FIG. 13

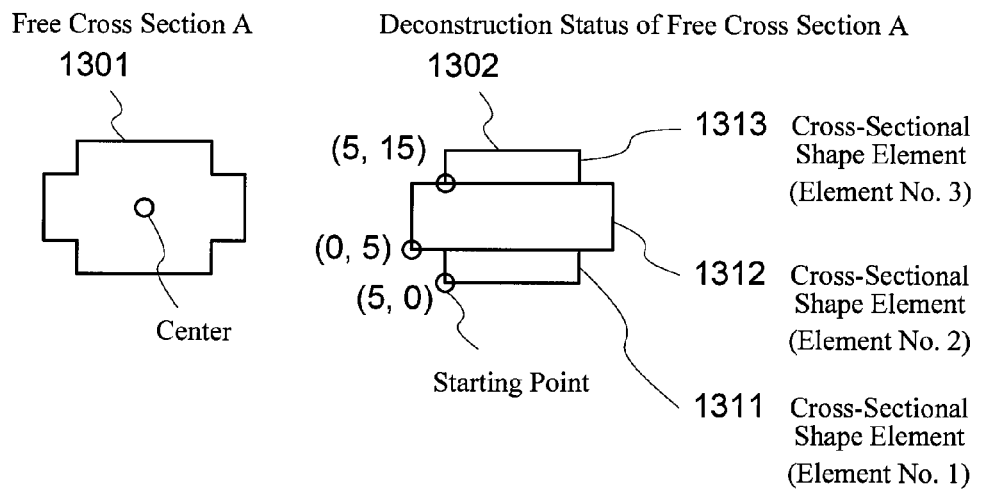

Free Cross Section A
1301

Deconstruction Status of Free Cross Section A
1302

1313 Cross-Sectional Shape Element (Element No. 3)

1312 Cross-Sectional Shape Element (Element No. 2)

1311 Cross-Sectional Shape Element (Element No. 1)

Center

Starting Point

1303  Cross-Sectional Shape Element List

| ID | No. | Cross-Sectional Shape | X | Y | Width | Height |
|---|---|---|---|---|---|---|
| A | 1 | rectangular | 5 | 0 | 20 | 5 |
| A | 2 | rectangular | 0 | 5 | 30 | 10 |
| A | 3 | rectangular | 5 | 15 | 20 | 5 |

THREE-DIMENSIONAL DATA GENERATION DEVICE, METHOD AND PROGRAM THEREOF

BACKGROUND OF THE INVENTION

1. Field of the Invention

The present invention relates to a three-dimensional data generation device for generating three-dimensional data that represents the continuous arrangement of elongated components such as pipes, electric cable housing components, air conditioning ducts or the like using a computer, and to a method and a program thereof.

2. Description of the Related Art

The arrangement of elongated components such as pipes, electric cable housing components, air conditioning ducts or the like in thermal, nuclear and hydroelectric power plants is addressed in the arrangement plan during plant planning. The arrangement is planned nowadays using three-dimensional arrangement adjustment CAD, thanks to its convenience in terms of data input and management of subsequent downstream expansions.

The arrangement of all components that may come under the plan should be planned ahead using three-dimensional arrangement adjustment CAD. Depending on the circumstances, however the situation at the construction site may take precedence, and arrangement changes become unavoidable. For instance, the arrangement of a component in design has to be modified so as to avoid interference when, for instance, the component crosses a site at which a preceding component has been already buried.

When depending on the circumstances of the construction site it becomes apparent that support components must be mounted, there are modified, within allowable margins, the mounting positions of support components of pipes and electric cable housing components whose route can be modified.

Among elongated components such as pipes, electric cable housing components, air conditioning ducts or the like, those that can be modified at the construction site and that require no previous manufacturing at a factory, are significantly affected by the conditions at the construction site. Mounting of these components can thus be modified at the construction site.

Information relating to effects on component arrangement, for instance the impossibility of mounting a support component, is learned at the construction site. As a result, it becomes necessary to check three-dimensional information component arrangement at the construction site. Ordinarily, the construction site is not an environment where large-scale three-dimensional arrangement adjustment CAD can be used, and hence it would be desirable to be able to check three-dimensional information by means of a simple system.

Isometric drawings that portray the state of the completed facility are generated as the final drawings used at the construction site. Isometric drawings may also be generated for repair works and the like through, for instance, on-site measuring of already-existing elongated components. That is, isometric drawings may be generated through, for instance, on-site measuring of already-existing elongated components such as pipes, electric cable housing components, air conditioning ducts or the like.

Herein, it is highly effective to convert quickly the information of an isometric drawing thus generated into three-dimensional data, as information on the construction site, and to compare the three-dimensional data with planning already completed. Operational efficiency as well can potentially be increased if the three-dimensional data can be outputted, in the form of drawings, for downstream expansion.

In conventional technologies, however, it was not possible to convert the state of a three-dimensional space into three-dimensional data without using three-dimensional arrangement adjustment CAD. Inevitably, the three-dimensional arrangement adjustment CAD had to be used also for simple checks, which involved thus substantial effort.

For instance, Japanese Patent Application Laid-open No. H04-10070 discloses a method that involves imaging the three-dimensional shape and the mounting position of a component in an actual construction state, to obtain thereby actual observed images; generating three-dimensional design information on the basis of two-dimensional design information of the component at a design stage, to obtain thereby pseudo-observed images; and contrasting the pseudo-observed images with the actual observed images, to modify the design information.

Also, Japanese Patent Application Laid-open No. 2002-7485 discloses a method that involves storing on-site measurement data of a structure being actually manufactured in an as-built 3D-CAD database; comparing the on-site measurement data with data in a design CAD database; and calculating dimensional errors, to grade thereby the manufactured structure.

These methods require using three-dimensional CAD, and involve comparison of three-dimensional image data obtained through observation and measurement at the actual construction stage with three-dimensional image data at the design stage. By their nature, these methods entail substantial workloads in terms of large volumes of data and large-scale complex processes. It has been difficult therefore to use these conventional methods as methods that allow on-site measurement results to be converted easily into three-dimensional data to be checked.

In conventional technologies, as described above, three-dimensional arrangement adjustment CAD must be used also for simply checking three-dimensional information on the arrangement of elongated components such as pipes, electric cable housing components, air conditioning ducts or the like at a construction site. This requires a check operation that takes time and effort.

SUMMARY OF THE INVENTION

The present invention is proposed for solving the above-described conventional problems. It is an object of the present invention to provide a three-dimensional data generation device, and a method and a program thereof, in which three-dimensional data can be easily and automatically generated using existing non-three-dimensional data in the form of isometric drawings or the like, without resorting to three-dimensional arrangement adjustment CAD, when it is necessary to check three-dimensional information on the arrangement of elongated components such as pipes, electric cable housing components, air conditioning ducts or the like at a construction site.

In order to attain the above object, the present invention provides a three-dimensional data generation device for generating, using a computer, three-dimensional data that represents a continuous arrangement of target components in a three-dimensional space, wherein the computer comprises: interface means for issuing various instructions and inputting and outputting data; three-dimensional data generation means for generating target component arrangement three-dimensional data by processing target component arrangement spreadsheet data where a spreadsheet represents information on each node point comprising information on a plurality of items that include three-dimensional spatial coordinates, as information relating to a plurality of node points denoting direction conversion points, connection points, branching points, end points or other characteristic points, on a continuous arrangement route of target components; and storage means for storing target component arrangement spreadsheet data acquired via the interface means or other means, and target component arrangement three-dimensional data obtained as a result of processing by the three-dimensional data generation means; wherein the three-dimensional data generation means has the following technical characteristics.

Specifically, the three-dimensional data generation means has data edition means, three-dimensional data conversion means and three-dimensional data management means. The data edition means reads target component arrangement spreadsheet data stored in the storage means and edits the spreadsheet data by performing data edition on information on the plurality of items in the read spreadsheet data, in response to an edition instruction or data input from the interface means. On the basis of spreadsheet data acquired as a result of processing by the data edition means, the three-dimensional data conversion means arranges the node points in a three-dimensional space, connects node points having a predetermined relationship using line segments, and imparts cross-sectional shapes to the connected line segments, to carry out thereby conversion into target component arrangement three-dimensional data. The three-dimensional data management means stores the target component arrangement three-dimensional data obtained by the three-dimensional data conversion means in the storage means, in a format readable by three-dimensional CAD or three-dimensional review system, and outputs the data in response to an output instruction from the interface means.

The three-dimensional data generation method and the three-dimensional data generation program of the present invention incorporate the characteristics of the above-mentioned system into a method and a computer program, respectively.

The present invention, thus, allows easily generating target component arrangement three-dimensional data automatically by using target component arrangement spreadsheet data representing information on each node point comprising information on a plurality of items, as information relating to a plurality of node points on a continuous arrangement route of target components, by connecting the node points with line segments, and by imparting cross-sectional shape to the line segments. When it is necessary to check three-dimensional information on component arrangement, data can be easily outputted on screen as three-dimensional image data by storing the generated three-dimensional data in a storage means in a format readable by three-dimensional CAD or three-dimensional review system. As a result, data handling becomes very supple, which allows easing the workload of the user during check operation or the like.

The target component arrangement spreadsheet data can be generated more easily in accordance with a method that involves sequentially inputting route data of the component arrangement, along routes, using existing data such as an isometric drawing. In the three-dimensional data generation means of the present invention, moreover, information data on a plurality of items of each node point included in the spreadsheet data can be freely edited. Therefore, data can be easily and quickly supplemented and/or updated in the three-dimensional data generation means when part of the generated spreadsheet data is missing or when data must be updated, also halfway during three-dimensional data generation.

It is therefore possible to easily generate spreadsheet data that is simple to handle, by using existing non-three-dimensional data such as an isometric drawing, while the generated spreadsheet data can be automatically converted, as it is, into three-dimensional data. As a result, target component arrangement three-dimensional data can be automatically generated in a simple manner and with good efficiency.

The present invention succeeds in providing a three-dimensional data generation device, and a method and a program thereof, in which three-dimensional data can be generated automatically, easily and efficiently, using existing non-three-dimensional data in the form of isometric drawings or the like, when it is necessary to check three-dimensional information on the arrangement of elongated components such as pipes, electric cable housing components, air conditioning ducts or the like.

BRIEF DESCRIPTION OF THE DRAWINGS

FIG. 8 is a flowchart illustrating an example of spreadsheet data generated by way of the data edition unit illustrated in FIG. 1;

FIG. 12 is a diagram illustrating a specific example of a cross-sectional shape specification method by way of a cross-sectional shape specification unit of the data edition unit illustrated in FIG. 1;

FIG. 13 is a diagram illustrating an example of a free cross section specification method in the cross-sectional shape specification method illustrated in FIG. 12;

DESCRIPTION OF THE PREFERRED EMBODIMENTS

An embodiment to which the three-dimensional data generation device of the present invention is applied, will be explained in detail below with reference to accompanying drawings.

{Spreadsheet Data}

The spreadsheet data used in the present embodiment includes information on a plurality of items, for instance items (a) to (h) given below, as information on each node point:

(a) component name or component identifier specifying the component at the node point;
(b) three-dimensional spatial coordinates of the node point;
(c) coordinate specification information for specifying whether the three-dimensional spatial coordinates of the node point are absolute coordinates or relative coordinates;
(d) node status information specifying whether the status of the node is that of a branching point, an end point, or a characteristic point other than the foregoing;
(e) connection relationship information specifying a connection relationship between the node point and another node point;
(f) insertion component information specifying component type and face-to-face dimensions of a component when it is inserted at the node point;
(g) cross section information specifying the dimensions and shape of the cross section of the node point; and
(h) trajectory position information specifying the position of the cross section at which the trajectory of the coordinates of the node point is located.

{Device Configuration}

Figure 1:
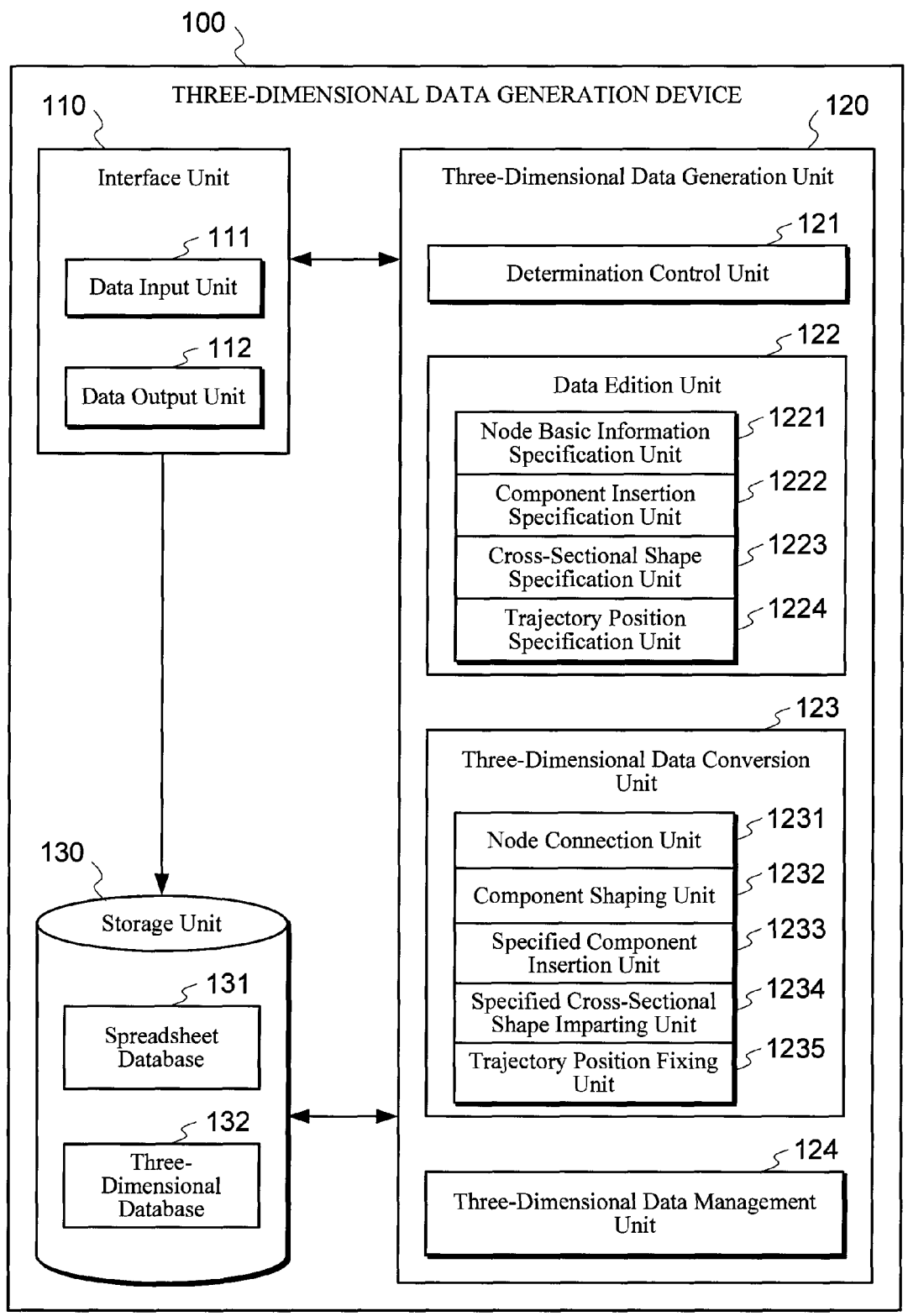
FIG. 1 is a block diagram illustrating the configuration of a three-dimensional data generation device according to an embodiment using the present invention.

FIG. 1 is a block diagram illustrating the configuration of a three-dimensional data generation device 100 according to an embodiment of the present invention.

As illustrated in FIG. 1, the three-dimensional data generation device 100 according to the present embodiment comprises an interface unit 110 that inputs and outputs various instructions and data; a three-dimensional data generation unit 120 that generates target component arrangement three-dimensional data by processing target component arrangement spreadsheet data; and a storage unit 130 that stores target component arrangement spreadsheet data and target component arrangement three-dimensional data obtained as a result of processing by the three-dimensional data generation unit 120. The three-dimensional data generation device 100 is embodied in a general-purpose personal computer having built thereinto a program customized for implementing the characteristic functions of the present invention. Details on the various units follow below.

The interface unit 110 comprises a data input unit 111 and a data output unit 112. The data input unit 111 is an input device, such as a mouse or a keyboard, that inputs various instructions and data into the computer, in response to user operation. The data output unit 112 is an output device, such as a display or a printer, that outputs and/or displays to the user data inputted via the data input unit 111, data stored in the storage unit 130, as well as results of processing by the three-dimensional data generation unit 120. The interface unit 110 mediates exchanges between the computer and the user, and is ordinarily referred to as "user interface" or the like.

The three-dimensional data generation unit 120 is a means for generating target component arrangement three-dimensional data by processing target component arrangement spreadsheet data including three-dimensional spatial coordinates of various node points on a continuous arrangement route of target components. The three-dimensional data generation unit 120 comprises a determination control unit 121, a data edition unit 122, a three-dimensional data conversion unit 123 and a three-dimensional data management unit 124. The various units 121 to 124 that make up the three-dimensional data generation unit 120 are embodied as a combination of a microprocessor and memory, which are the main constituent elements of a computer, and of program modules customized for implementing the characteristic functions of the various units.

The determination control unit 121, which is the main agent in the three-dimensional data generation process by the three-dimensional data generation unit 120, drives the generation process forward by determining the status of the process while controlling the other units.

The data edition unit 122 has a data edit function of editing spreadsheet data on the basis of various instructions and data inputs by the user. Specifically, the data edition unit 122 is a means for reading target component arrangement spreadsheet data stored in the storage unit 130, and editing information of a plurality of items in response to various instructions or data inputs via the interface unit 110.

The data edition unit 122 has also the function of newly generating spreadsheet data by displaying on screen images of the format of spreadsheet data including information names of a plurality of items and supporting data input from the user when there is no target component arrangement spreadsheet data that can be used.

The data edition unit 122 has also the function of storing, in the storage unit 130, spreadsheet data obtained as a process result, and the function of managing the spreadsheet data stored in the storage unit 130, and outputting data as-needed from the data output unit 112 in accordance with a data output instruction issued by the user via the data input unit 111.

Depending on the information to be data-edited, the data edition unit 122 comprises a node basic information specification unit 1221, a component insertion specification unit 1222, a cross-sectional shape specification unit 1223 and a trajectory position specification unit 1224.

The node basic information specification unit 1221 is a means for specifying or modifying these node basic informations (b) to (e), wherein three-dimensional spatial coordinates (b), coordinate specification information (c), node status information (d) and connection relationship information (e) are collectively defined as "node basic information", which provide basic information relating to node point position and connection. The component insertion specification unit 1222 is a means for specifying or modifying insertion component information (f). The cross-sectional shape specification unit 1223 is a means for specifying or modifying cross section information (g). The trajectory position specification unit 1224 is a means for specifying or modifying trajectory position information (h).

The three-dimensional data conversion unit 123 has a function of converting present-stage spreadsheet data obtained in the three-dimensional data generation unit 120 into three-dimensional data. Specifically, the three-dimensional data conversion unit 123 is a means for, on the basis of spreadsheet data acquired as a result of processing by the data edition unit 122, arranging node points in the three-dimensional space, connecting with line segments node points having a predetermined relationship, and imparting a cross-sectional shape to the connected line segments, to convert thereby the spreadsheet data into target component arrangement three-dimensional data. The three-dimensional data conversion unit 123 comprises a node connection unit 1231, a component shaping unit 1232, a specified component insertion unit 1233, a specified cross-sectional shape imparting unit 1234 and a trajectory position fixing unit 1235.

The node connection unit 1231 is a means for arranging node points in the three-dimensional space and connecting with line segments or points those node points having a continuous arrangement relationship and the node points having a specified arrangement relationship, on the basis of node basic informations (b) to (e) on the node points, namely three-dimensional spatial coordinates (b), coordinate specification information (c), node status information (d) and connection relationship information (e). The component shaping unit 1232 is a means for arranging straight-line components by imparting cross-sectional shape to the straight-line portions of connected line segments, and for arranging bent components having cross-sectional shape at portions of vector change, to yield continuous components, on the basis of a pre-set default cross-sectional shape (circular cross-sectional shape or rectangular cross-sectional shape).

The specified component insertion unit 1233 is a means for inserting specified components at specified node points, with specified face-to-face dimensions, when the spreadsheet data contains insertion component information (f) on the node points. The specified cross-sectional shape imparting unit 1234 is a means for imparting specified dimensions and shape to the cross section of node points, on the basis of node point cross section information (g). The trajectory position fixing unit 1235 is a means for fixing a specified position of the cross section relative to the trajectory of the coordinates of a node point, on the basis of trajectory position information (h) of the node point.

The three-dimensional data management unit 124 is a means for storing, in the storage unit 130, three-dimensional data of the target component arrangement obtained in the three-dimensional data conversion unit 123, in a format readable by three-dimensional CAD or three-dimensional review system, and for outputting data in accordance with an output instruction from the interface unit 110.

The storage unit 130 is realized as a hard disk fixedly mounted in a computer, or as at least one storage device selected from among detachable CD, DVD, MO or other auxiliary storage devices. A spreadsheet database 131 of the target component arrangement and a three-dimensional database 132 of the target component arrangement are built in a storage region of the storage unit 130.

The target component arrangement spreadsheet database 131 has stored therein target component arrangement spreadsheet data inputted via the interface unit 110, or target component arrangement spreadsheet data obtained as a result of processing in the three-dimensional data generation device 100. The target component arrangement three-dimensional database 132 has stored therein target component arrangement three-dimensional data obtained as a result of processing in the three-dimensional data generation unit 120.

{Operation}

The operation of the three-dimensional data generation device 100 of the present embodiment having the above-described configuration will be explained next.

Figure 2:
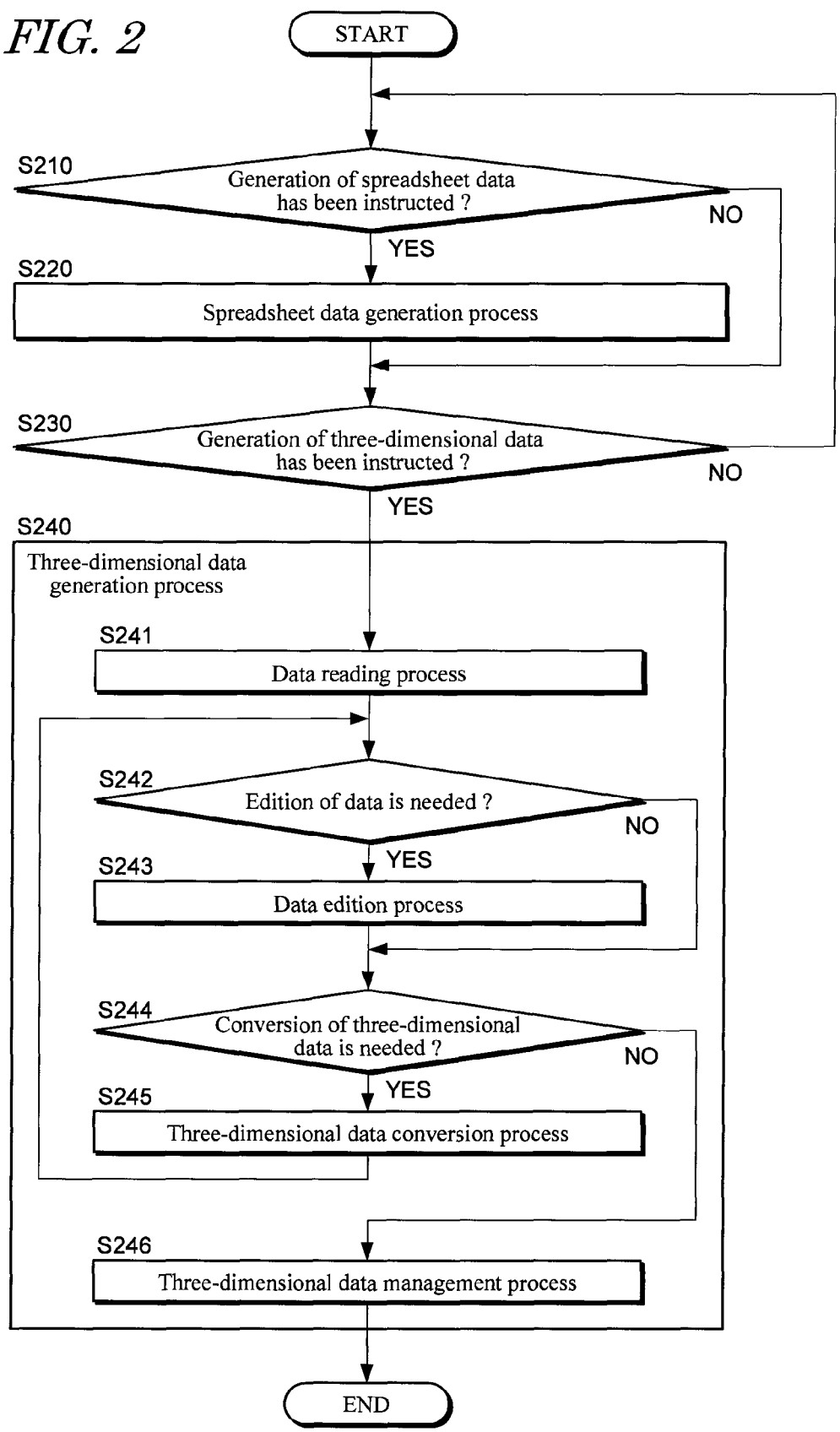
FIG. 2 is a flowchart illustrating schematically a process flow in the three-dimensional data generation device illustrated in FIG. 1.

FIG. 2 is a flowchart illustrating schematically the process flow in the three-dimensional data generation device 100 of the present embodiment. In the three-dimensional data generation device 100, as illustrated in FIG. 2, the determination control unit 121 of the three-dimensional data generation unit 120 generates spreadsheet data by way of the data edition unit 122 when a data generation instruction is inputted (YES in S210) by the user following display on a GUI screen for menu selection (spreadsheet data generation process S220).

Figure 3:
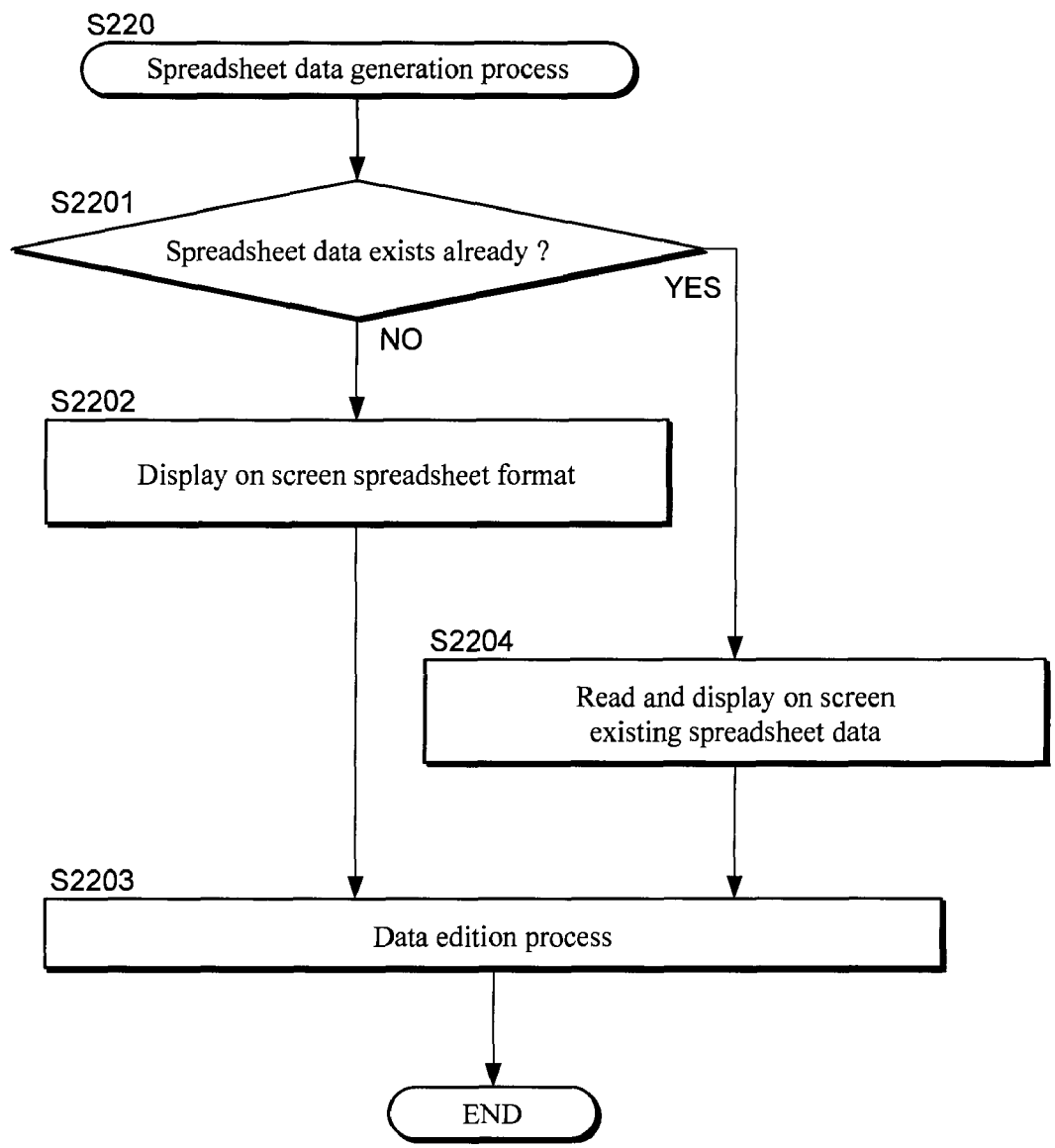
FIG. 3 is a flowchart illustrating an example of a spreadsheet data generation process illustrated in FIG. 2.

FIG. 3 is a flowchart illustrating an example of the spreadsheet data generation process S220. In the spreadsheet data generation process S220, as illustrated in FIG. 3, the data edition unit 122 determines whether spreadsheet data exists already in the spreadsheet database 131 of the storage unit 130 (S2201).

When there is no existing spreadsheet data (NO in S2201), the data edition unit 122 displays on screen a spreadsheet format for spreadsheet data input, by way of the interface unit 110 (S2202), and performs a data edition process (S2203), to generate new spreadsheet data.

Herein, the spreadsheet format is a format in which information names are assigned to a plurality of items, and data fields for respective items are set to blank fields. In existing spreadsheet data there is inputted, partially or completely, data of the same format. When there is existing spreadsheet data (YES in S2201), the data edition unit 122 reads the spreadsheet data, displays the spreadsheet data on-screen, and performs a data edition process (S2203), to update the read spreadsheet data.

In the data edition process S2203, the data edition unit 122 edits the spreadsheet data through an interactive exchange between the user and the device, involving various instructions and data inputs by the user in response to screen displays, and involving on-screen display of various data process results, on the part of the device, in response to the instructions and/or data inputs by the user. Such a spreadsheet edition method is an ordinary known method, and therefore can be easily realized using known highly versatile spreadsheet program modules.

For instance, the spreadsheet data on the target component arrangement is generated by way of an edition method wherein the data edition unit 122 assigns a plurality of item names, displays on screen a spreadsheet having a plurality of item names and blank fields, as data fields of respective items, on the display of the data output unit 112, and data is inputted in data fields of respective items of the displayed spreadsheet in accordance with instructions and/or data inputs issued by the user via the data input unit 111. Such a spreadsheet edition method is an ordinary method already in existence, and therefore can be easily realized using known highly versatile spreadsheet program modules.

Figure 4:
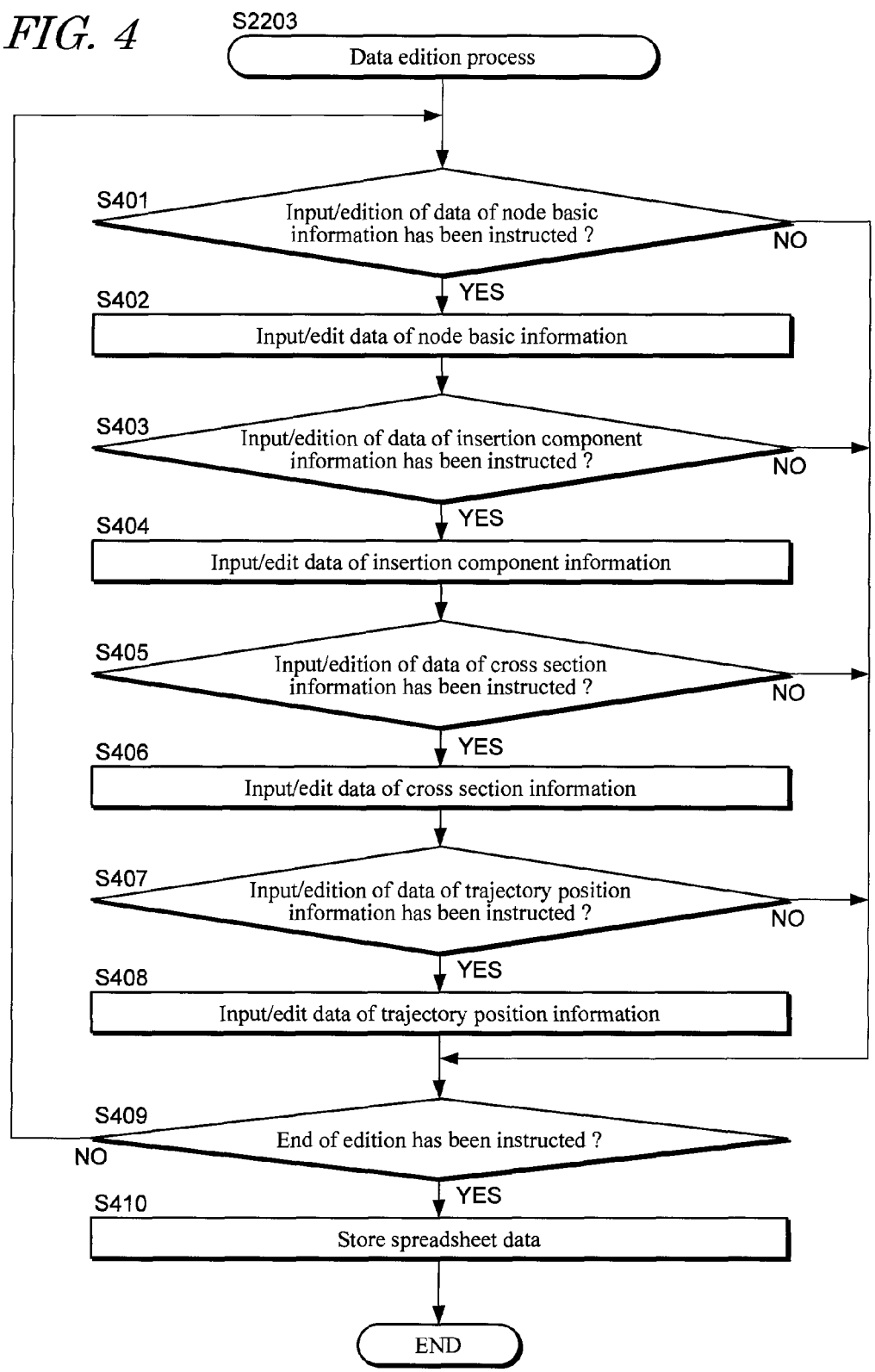
FIG. 4 is a flowchart illustrating an example of the data edition process illustrated in FIG. 3.

FIG. 4 is a flowchart illustrating an example of a data edition process S2203 in such a spreadsheet data generation process S220. As illustrated in FIG. 4, when in the data edition process (S2203) the user instructs input or edition of data in fields of node basic informations (b) to (e), namely three-dimensional spatial coordinates (b), coordinate specification information (c), node status information (d) and connection relationship information (e), for a certain node, in the spreadsheet displayed on the screen of the display of the data output unit 112 (YES in S401), the data edition unit 122 inputs or edits data of node basic informations (b) to (e) for that node point, in accordance with the content of the instruction, by way of the node basic information specification unit 1221 (S402).

When the user instructs input or edition of data in the fields of insertion component information (f) of a certain node point (YES in S403), the data edition unit 122 inputs or edits data of insertion component information (f) for that node point, in accordance with the content of the instruction, by way of the component insertion specification unit 1222 (S404).

When the user instructs input or edition of data in the fields of cross section information (g) of a certain node point (YES in S405), the data edition unit 122 inputs or edits data of cross section information (g) for that node point, in accordance with the content of the instruction, by way of the cross-sectional shape specification unit 1223 (S406).

When the user instructs input or edition of data in the fields of trajectory position information (h) of a certain node point (YES in S407), the data edition unit 122 inputs or edits data of trajectory position information (h), as target data, for that node point, in accordance with the content of the data update instruction, by way of the trajectory position specification unit 1224 (S408).

When the user issues an edition end instruction (YES in S409), the spreadsheet data obtained as a result of processing up to that point in time is stored in the spreadsheet database 131 of the storage unit 130 (S410).

When the user inputs a three-dimensional data generation instruction following display on a GUI screen for menu selection (YES in S230), the determination control unit 121 of the three-dimensional data generation unit 120 initiates a series of three-dimensional data generation processes (S240), as illustrated in FIG. 2.

In the three-dimensional data generation process S240, as illustrated in FIG. 2, the determination control unit 121 of the three-dimensional data generation unit 120 reads firstly, by way of the data edition unit 122, target component arrangement stored in the spreadsheet database 131 of the storage unit 130, and displays the spreadsheet data on screen (data reading process S241).

When the data displayed on screen must be edited, for instance when data is missing in the read target component arrangement spreadsheet data or when the user issues a data edition instruction (YES in S242), the determination control unit 121 carries out a data edition process on the spreadsheet data, by way of the data edition unit 122 (S243).

In the data edition process S243, the data edition unit 122 performs the same process as in the data edition process S2203 illustrated in FIG. 4. That is, the edition method in the data edition process S243 in the three-dimensional data generation process S240 is basically the same edition method as explained for the data edition process S2203 in the spreadsheet data generation process S220. In the data edition process S243 of the three-dimensional data generation process S240 as well, therefore, the data edition unit 122 stores in the spreadsheet database 131 of the storage unit 130 spreadsheet data obtained as a result of processing up to the point in time when the user issues an edition end instruction (S410).

On the other hand, when conversion into three-dimensional data is required (YES in S244), for instance when the read spreadsheet data is convertible as it is to three-dimensional data, or when the user issues an instruction of conversion into three-dimensional data for the spreadsheet data edited in the data edition process S243, as illustrated in FIG. 2, the determination control unit 121 converts the spreadsheet data into three-dimensional data by way of the three-dimensional data conversion unit 123 (three-dimensional data conversion process S245).

In the present embodiment, the data edition process S243 and the three-dimensional data conversion process S245 can be executed repeatedly, as illustrated in FIG. 2. The data edition process S243 and the three-dimensional data conversion process S245 can also be executed simultaneously in parallel.

Figure 5:
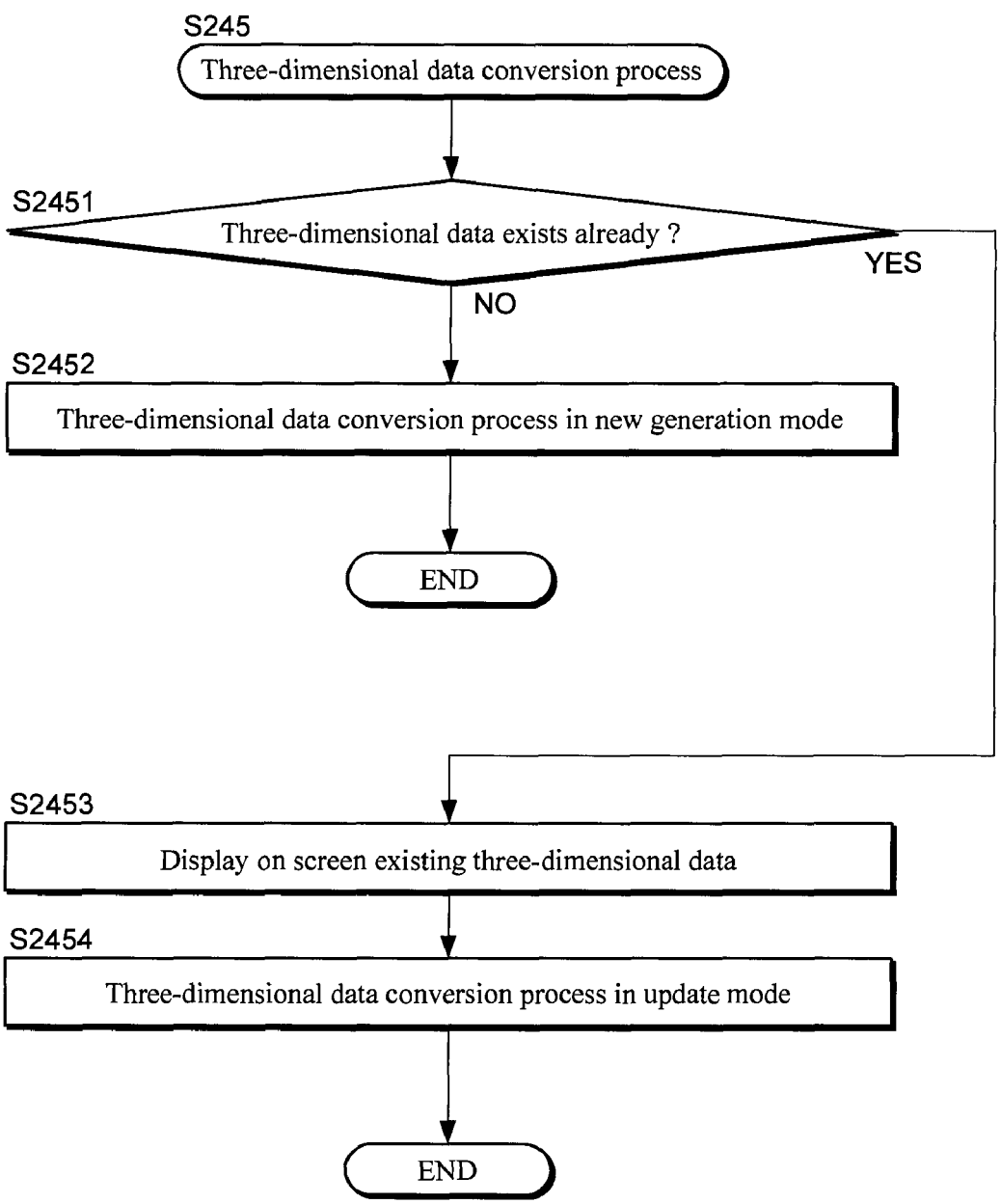
FIG. 5 is a flowchart illustrating an example of the three-dimensional data conversion process illustrated in FIG. 2.

FIG. 5 is a flowchart illustrating an example of the three-dimensional data conversion process S245 that can be executed simultaneously in parallel to the data edition process S243. In the three-dimensional data conversion process S245, the three-dimensional data conversion unit 123 executes a three-dimensional data conversion process S2452 in new generation mode when there is no existing three-dimensional data, converted in the past, relating to the current spreadsheet data acquired from the data edition unit 122 (NO in S2451).

For instance, when the user issues a three-dimensional data conversion instruction on spreadsheet data newly generated, or when the user issues a three-dimensional data conversion instruction during the initial data edition, the three-dimensional data conversion process S2452 in new generation mode is executed for the newly generated spreadsheet data, or for spreadsheet data being currently edited.

By contrast, when there is existing three-dimensional data, converted in the past, relating to the current spreadsheet data acquired from the data edition unit 122 (YES in S2451), the three-dimensional data conversion unit 123 causes the existing three-dimensional data to be displayed on screen (S2453) and executes a three-dimensional data conversion process in update mode (S2454).

In the three-dimensional data generation unit 120 executing of the process flow illustrated in FIG. 2, for instance, when a second or subsequent data edition is completed or during data edition which is performed after three-dimensional data, which is obtained as a result of a first three-dimensional data conversion after a first data edition, is saved in the three-dimensional data generation unit 120 or the storage unit 130, the three-dimensional data obtained as a result of the first three-dimensional data conversion is already present in the three-dimensional data generation unit 120 or the storage unit 130.

When the user issues such a three-dimensional data conversion instruction corresponding to the edit content of the present-stage spreadsheet data upon completion of a second or subsequent data edition, or during data edition, the three-dimensional data conversion unit 123 executes a three-dimensional data conversion process (S2454) in update mode, with the existing three-dimensional data obtained as a result of the first data conversion displayed on screen (S2453).

In the present embodiment, the three-dimensional data ultimately obtained through execution of the process flow is stored in the three-dimensional database 132 of the storage unit 130, in a predetermined format, by the three-dimensional data management unit 124, as described below. However, it is possible to freely select the method for saving the three-dimensional data halfway during execution of the process flow prior to that.

For instance, the generation history of the three-dimensional data obtained halfway during execution of the process flow may be saved in the three-dimensional data generation unit 120 until completion of the process flow, after which only the three-dimensional data ultimately obtained is stored in the storage unit 130. Also, three-dimensional data in the three-dimensional database 132 may be updated, on the basis of obtained three-dimensional data for each three-dimensional data conversion process.

Figure 6:
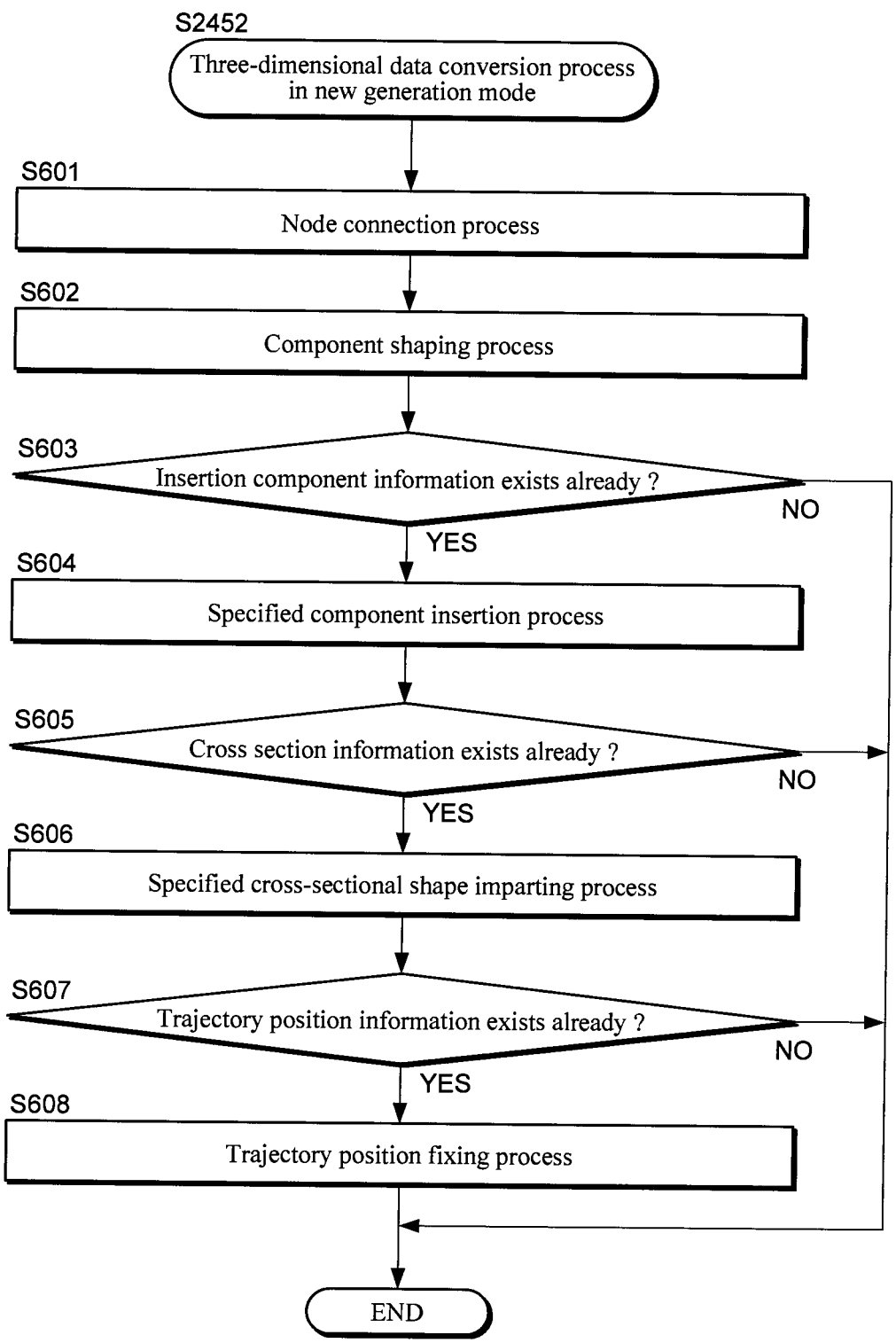
FIG. 6 is a flowchart illustrating an example of the three-dimensional data conversion process illustrated in FIG. 5, in new generation mode.

FIG. 6 is a flowchart illustrating an example of the three-dimensional data conversion process S2452 in new generation mode illustrated in FIG. 5. In the three-dimensional data conversion process S2452 in new generation mode, as illustrated in FIG. 6, firstly the three-dimensional data conversion unit 123 arranges node points in the three-dimensional space and connects with line segments or points those node points having a continuous arrangement relationship or those node points having a specified connection relationship, by way of the node connection unit 1231, on the basis of node basic informations (b) to (e) for each node point included in the spreadsheet data (node connection process S601).

In the node connection process S601, specifically, the node connection unit 1231 firstly arranges the node points in a three-dimensional space, and then sequentially connects with line segments those node points having a continuous arrangement relationship, on the basis of the three-dimensional spatial coordinates (b) and the coordinate specification information (c) of the node points included in the spreadsheet data, and connects with line segments or points the node points having a specified connection relationship on the basis of the node status information (d) and the connection relationship information (e). A diagram that depicts the routes of the target component arrangement is generated as a result of the node connection process S601. The three-dimensional data conversion unit 123 displays on screen the rendering state resulting from the node connection process S601 on the display of the data output unit 112.

Next, the three-dimensional data conversion unit 123, by way of the component shaping unit 1232, on the basis of a default cross-sectional shape (circular cross-sectional shape or rectangular cross-sectional shape) set up beforehand, generates firstly straight-line components by imparting a circular cross-sectional shape or rectangular cross-sectional shape to straight-line portions, and inserts next an elbow having the same cross-sectional shape at portions of vector change. Subsequently, the straight-line portions before and behind the elbow are trimmed, to render a smooth component connection (component shaping process S602). The three-dimensional data conversion unit 123 displays on screen the rendering state resulting from the component shaping process S602 on the display of the data output unit 112.

When insertion component information (f) on a node point is included in the spreadsheet data (YES in S603), the three-dimensional data conversion unit 123 inserts the component specified in the insertion component information (f) at the node point for which insertion component information (f) is contained in the spreadsheet data, with specified face-to-face dimensions, by way of the specified component insertion unit 1233 (specified component insertion process S604). The three-dimensional data conversion unit 123 displays on screen the rendering state resulting from the specified component insertion process S604 on the display of the data output unit 112. In the specified component insertion process S604, insertion components can also be formed by imparting a default cross-sectional shape to the components in the same way as in the component shaping process S602.

The "default cross-sectional shape" is a circular cross-sectional shape or a rectangular cross-sectional shape of pre-determined dimensions pre-set as a default value of cross-sectional shape in the three-dimensional data conversion unit 123. In the present embodiment, using such a default cross-sectional shape having a simple shape allows imparting a provisional simple cross-sectional shape to the target component arrangement, prior to the below-described specified cross-sectional shape imparting process S606, to generate thereby three-dimensional data of simple continuous components and to display on-screen the rendering state of the three-dimensional data.

To that end, the user can edit data efficiently, in accordance with a procedure, in a first data edition process, in accordance with a free procedure that may involve holding edition of data on, for instance, cross section information (g), trajectory position information (h) or the like, and confirmation of three-dimensional data of continuous components having a provisional simple cross-sectional shape obtained in component shaping process S602 and/or specified component insertion process S604, followed by addition of insertion component information (f), or data edition on cross section information (g) and/or trajectory position information (h).

In FIG. 6, the specified component insertion process S604 is recited after the component shaping process S602, but since the processes share the feature of component formation, the specified component insertion process S604 may be executed, in an actual procedure, as part of the component shaping process S602, or as a simultaneous parallel process.

When cross section information (g) on the node points is included in the spreadsheet data (YES in S605), the three-dimensional data conversion unit 123 imparts specified dimensions and shape to the cross section of the node points, by way of the specified cross-sectional shape imparting unit 1234, on the basis of the cross section information (g) of the node points (specified cross-sectional shape imparting process S606). The three-dimensional data conversion unit 123 displays on screen the three-dimensional data obtained as a result of the specified cross-sectional shape imparting process S606 on the display of the data output unit 112.

When trajectory position information (h) on the node points is included in the spreadsheet data (YES in S607), the three-dimensional data conversion unit 123 fixes a specified position of the cross section relative to the trajectory of the coordinates of a node point, by way of the trajectory position fixing unit 1235, on the basis of trajectory position information (h) of the node points (trajectory position fixing process S608). The three-dimensional data conversion unit 123 displays on screen three-dimensional data, resulting from fixing the specified positions of the cross sections to the coordinate trajectories in the trajectory position fixing process S608, on the display of the data output unit 112.

Figure 7:
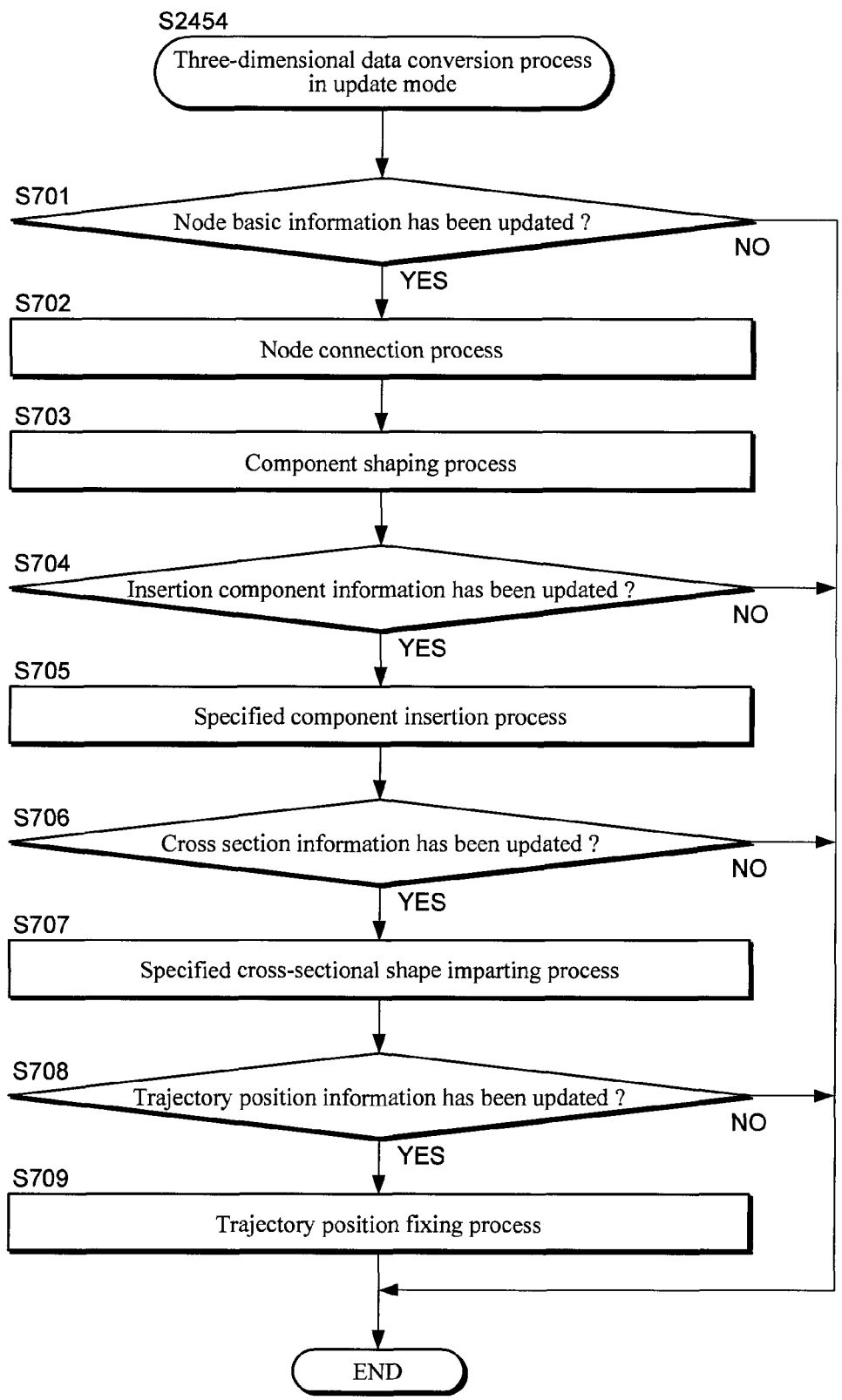
FIG. 7 is a flowchart illustrating an example of the three-dimensional data conversion process illustrated in FIG. 5, in update mode.

FIG. 7 is a flowchart illustrating an example of the three-dimensional data conversion process S2454 in update mode illustrated in FIG. 5. In the three-dimensional data conversion process S2454 in update mode, as illustrated in FIG. 7, the three-dimensional data conversion unit 123 performs an individual data conversion process for an updated data portion in accordance with data-updated information from among the current spreadsheet data, with existing three-dimensional data displayed on screen. As a result, the three-dimensional data displayed on screen can be updated so as to match current spreadsheet data.

Specifically, if the data-updated information in the spreadsheet data is a node basic information such as three-dimensional spatial coordinates (b), coordinate specification information (c), node status information (d) or connection relationship information (e) (YES in S701), the three-dimensional data conversion unit 123 executes a node connection process, by way of the node connection unit 1231, and a component shaping process, by way of the component shaping unit 1232, on the updated data portion (S702, S703), to update thereby the three-dimensional data being displayed.

When the data-updated information in the spreadsheet data is insertion component information (f) (YES in S704), the three-dimensional data conversion unit 123 executes a specified component insertion process (S705), by way of the specified component insertion unit 1233, on the updated data portion, to update thereby the three-dimensional data being displayed. That is, the specified component insertion unit 1233 performs a process of adding a new insertion component to the three-dimensional data being displayed, in accordance with a data update such as addition of new insertion component information into the current spreadsheet data, or modification or deletion of existing insertion component information. Alternatively, the specified component insertion unit 1233 performs a process of modifying the insertion position and/or the face-to-face dimensions of an existing insertion component, or of deleting an existing insertion component.

If the data-updated information in the spreadsheet data is cross section information (g) (YES in S706), the three-dimensional data conversion unit 123 executes a specified cross-sectional shape imparting process (S707), by way of the specified cross-sectional shape imparting unit 1234, on the updated data portion, to update thereby the three-dimensional data being displayed. When the data-updated information in the spreadsheet data is trajectory position information (h) (YES in S708), the three-dimensional data conversion unit 123 executes a trajectory position fixing process (S709), by way of the trajectory position fixing unit 1235, on the updated data portion, to update thereby the three-dimensional data being displayed.

In FIG. 2, if spreadsheet data must be further edited, for instance halfway during or upon termination of the above-mentioned three-dimensional data conversion process S245, or when the user issues a data edition instruction (YES in S242), the determination control unit 121 returns to the data edition process S243. As a result, the determination control unit 121 repeats the series of processes S242 to S245, from determination of whether data edition is necessary up to the three-dimensional data conversion process, until three-dimensional data that matches the user generation intent is obtained.

Finally, when new three-dimensional data conversion is no longer necessary, i.e. when there is obtained three-dimensional data matching the user's generation intent (NO in S244), the determination control unit 121, by way of a three-dimensional data management unit 125, manages and stores the final target component arrangement three-dimensional data in the three-dimensional database 132 of the storage unit 130 in a format readable by three-dimensional CAD or three-dimensional review system (three-dimensional data management process S246).

In the three-dimensional data management process S246, the three-dimensional data management unit 125 outputs the three-dimensional data stored in the three-dimensional database 132 in accordance with a three-dimensional data output instruction issued by the user via the interface unit 110. Herein, the three-dimensional data management unit 125 not only causes the three-dimensional data to be displayed on the screen of the display of data output unit 112, but outputs also the three-dimensional data in various output formats according to the application of the data by the user, for instance by recording the three-dimensional data on an external recording medium that is removable from the data output unit 112, or by transmitting the data to an external device.

{Effect}

In the above-described embodiment, three-dimensional data can be generated automatically, easily and efficiently, using existing non-three-dimensional data in the form of isometric drawings or the like, without resorting to three-dimensional arrangement adjustment CAD, when it is necessary to check three-dimensional information on the arrangement of elongated components such as pipes, electric cable housing components, air conditioning ducts or the like at a construction site. Thus, it is possible to easily generate three-dimensional data on components measured at the actual construction site, so that the plant design burden can be eased accordingly. This contributes to realizing higher-quality plant design and manufacture. The effects elicited by the present embodiment are explained in detail below.

(1) Realization of Simple and Efficient Three-Dimensional Data Automatic Generation Using Existing Data As a result of using the present embodiment, target component arrangement three-dimensional data can be automatically generated easily by using target component arrangement spreadsheet data representing information on each node point comprising information on a plurality of items, as information relating to a plurality of node points on a continuous arrangement route of target components, and by connecting the node points with line segments and imparting cross-sectional shape to the line segments.

When it is necessary to check three-dimensional information on component arrangement, data can be easily outputted on screen as three-dimensional image data by storing the generated three-dimensional data in the three-dimensional database 132 of the storage unit 130 in a format readable by three-dimensional CAD or three-dimensional review system. As a result, data handling becomes very supple, which allows easing the workload of the user during check operation or the like.

In the three-dimensional data generation device 100 of the present embodiment, the user can generate target component arrangement spreadsheet data by carrying out an interactive process with the data edition unit 122 of the three-dimensional data generation unit 120 via the interface unit 110. The target component arrangement spreadsheet data can be generated more easily in accordance with a method that involves sequentially inputting route data of the component arrangement, along routes, using existing data such as an isometric drawing. The used spreadsheet data is not limited to data generated in the three-dimensional data generation device 100, and there may be inputted spreadsheet data generated by other devices.

In all cases, the spreadsheet data is fundamentally easy to handle. In the three-dimensional data generation unit 120 of the present embodiment, as a result, information data on a plurality of items of each node point included in the spreadsheet data can be edited, freely and easily, by way of the data edition unit 122. Therefore, data can be easily and quickly supplemented and/or updated in the three-dimensional data generation unit 120 when part of the generated spreadsheet data is missing or when data must be updated, also halfway during three-dimensional data generation. This makes for superior three-dimensional data generation flexibility.

The present embodiment, therefore, allows easily generating spreadsheet data that is simple to handle, by using existing data such as an isometric drawing, while the generated spreadsheet data can be automatically converted, as it is, into three-dimensional data. As a result, target component arrangement three-dimensional data can be automatically generated in a simple manner and with high efficiency. The generated three-dimensional data, moreover, is in a format readable by three-dimensional CAD or three-dimensional review system. The three-dimensional data has excellent handleability as a result.

(2) Increase of Efficiency by Means of Individual and Independent Three-Dimensional Data Conversion by Stages In three-dimensional data conversion by the three-dimensional data conversion unit 123 of the present embodiment, all the arranged components can be rendered in three dimensions by way of a node connection process in which node points are arranged in a three-dimensional space and the node points are connected by line segments, to generate a diagram; a component shaping process of imparting cross-sectional shape to the straight-line portions and vector change portions of the diagram and yielding thereby continuous components comprising straight-line components and bend components; and a specified component insertion process of inserting specified components at specified node points.

From the viewpoint of image complexity, these processes can be roughly divided into a first-stage node connection process of generating a diagram, and a second-stage component shaping process and specified component insertion process in which the diagram is rendered in the form of three-dimensional components. In the present embodiment, these two stages of dissimilar image complexity can be efficiently carried out independently from each other by stages by way of respective individual means. Therefore, target component arrangement three-dimensional data can be generated efficiently by stages.

In the component shaping process and the specified component insertion process, three-dimensional data can be generated, in the form of simple continuous components, by imparting provisional simple cross-sectional shape in the diagram denoting the route of the target component arrangement obtained as a result of the node connection process, by using default cross-sectional shape having a pre-set simple shape such as a circular cross-sectional shape or a rectangular cross-sectional shape. As a result, simple three-dimensional data can be obtained quickly also when the target component arrangement is complex and there are numerous node points, or when the specified cross-sectional shape is complex, or even if no cross-sectional shape is specified. Therefore, it becomes possible to offer a fast response to applications, such as schematic three-dimensional image check of the target component arrangement, halfway during the data edition operation.

After generation of simple three-dimensional data having a provisional simple cross-sectional shape, as described above, a specified cross-sectional shape imparting process of imparting a specified cross-sectional shape to the simple three-dimensional data, and a trajectory position fixing process of fixing a specified position of a cross section to the trajectory of the coordinates of each node point, can both be efficiently carried out independently from each other by respective individual means. More detailed three-dimensional data having a specified cross-sectional shape can be generated efficiently since the specified cross-sectional shape imparting process can be carried out independently, as described above, with good efficiency. At the same time, the trajectory position fixing process can likewise be carried out independently with good efficiency. As a result, more precise three-dimensional data can be generated efficiently by matching the trajectory of the coordinates to actual measurement positions relating to the dimensions of component cross sections.

(3) Increase of Efficiency by Way of Individual and Independent Data Edition Processes in Accordance with Information In the data edition process by the data edition unit 122 of the present embodiment, various processes including a node basic information data update process, a insertion component information data update process, a cross section information data update process and a trajectory position information data update process can be efficiently carried out independently from each other by respective individual means, in accordance with information to be edited in the spreadsheet data.

In particular, insertion component information data can be freely edited. Therefore, the user can freely set, at any stage, the position at which a component is inserted, as well as the type and dimensions of that component. Likewise, cross section information data can be freely edited. Therefore, the user can freely set, at any stage, the dimensions and shape of component cross sections. Further, trajectory position information data can also be freely edited. Therefore, the user can freely set, at any stage, what position in a cross-sectional shape is to be fixed to a trajectory position, in accordance with actually measured positions relating to the dimensions of the component cross section.

(4) Enhancement of Efficiency of Data Edition Operation by Repetition of Data Edition Process and Data Conversion Process In the present embodiment, the data edition process by the data edition unit 122 and the three-dimensional data conversion process by the three-dimensional data conversion unit 123 can be executed repeatedly. As a result, the user can check at any time the on-screen display of three-dimensional data corresponding to spreadsheet data at the current edition stage, by issuing a three-dimensional data conversion instruction while spreadsheet data is being edited. Using the three-dimensional data images, therefore, the user can grasp in real time, easily and accurately, the particulars of the editing of the spreadsheet data. The data edition operation can be carried out efficiently and accurately as a result.

{Specific Example of a Method for Generating Spreadsheet Data and Three-Dimensional Data}

Explanations follow next on a "specific example of spreadsheet data" generated by the three-dimensional data generation device of the present embodiment, as well as on specific examples of various methods using that spreadsheet data, for instance "example of three-dimensional data generation", "specific example of a method for inserting components at node points", "specific example of a cross-sectional shape specification method" and a "specific example of a trajectory position specification method".

{Specific Example of Spreadsheet Data}

FIG. 8 is a diagram illustrating an example of spreadsheet data generated by the data edition unit 122. The spreadsheet is formatted so as to represent information on one node point at each row, and information on one item at each column. The spreadsheet has arrayed therein information on a plurality of items, as information on each node point, the items including component name (a), cross-sectional shape (g1) and cross section size (g2), node status (d), trajectory position relative to cross section (h), component type (f1) and face-to-face dimensions (f2) of insertion components, coordinate specification information (c) denoted by the presence or absence of a symbol "O" on whether the coordinates are absolute coordinates (ABS) or relative coordinates, three-dimensional spatial coordinates (b) represented by the XYZ coordinate system, and connection relationship information (e). On the left side of the spreadsheet there are displayed consecutive numbers "801" to "811" that denote node point information (or the node point), for each row.

In node point information 801 of a first row in FIG. 8, for instance, the component name (a) is "steam pipe", the cross-sectional shape (g1) is "circular", the cross section size (g2) is "200A", the node status (d) is "starting point" and the trajectory position (h) is "center" of the cross section. The coordinate specification information (c) is "absolute coordinates (ABS)" and the three-dimensional spatial coordinates (b) are (1000, 1000, 1000). In node point informations 802 to 811 from the second row onwards there is entered data for only some of those informations, so that some fields appear blank.

The purpose of such field blanks is to employ data on one node point also in subsequent node points, wherever possible, in terms of simplifying and reducing to the utmost the data load of the spreadsheet as a whole. For instance, data are entered only at rows where data are updated for component name (a), cross-sectional shape (g1), cross section size (g2), node status (d), and trajectory position (h). The data entered in the above-lying row is used in the blank rows below.

As regards coordinate specification information (c) and the three-dimensional spatial coordinates (b), likewise, only relative-coordinates differences are entered for many nodes, and only the absolute coordinates (ABS) of reference nodes are entered, for the sake of data simplification. The symbol "O" is entered in the field of coordinate specification information (c) only when the coordinates are absolute coordinates. The field remains blank for relative coordinates. As regards the three-dimensional spatial coordinates (b), relative coordinates denoting a difference in XYZ coordinates are entered only when there is a difference relative to the node in the immediately above row, the symbol "-" being entered when there is no such difference.

The user can freely specify whether to use absolute coordinates or relative coordinates in the coordinate specification information (c). In the case of "starting point" in node status (d), however, relative coordinates cannot be obtained, and hence the coordinates are limited to absolute coordinates. Elsewhere both kinds of coordinates can be specified.

As regards node status (d), a status such as "starting point" or "branching point" can only be entered at the ends of a continuous route, other node points in the same route being blank. In FIG. 8, for instance, the node status (d) of the first node point information 801 reads "starting point", and the node status (d) of the eighth and tenth node point informations 808, 810 read "branching point".

When the node status (d) is "branching point", there is provided connection relationship information (e) denoting node points that have a connection relationship. In the example of FIG. 8, node points having a connection relationship are denoted with the same consecutive number, as the connection relationship information (e). In FIG. 8, for instance, the connection relationship information (e) of the eighth node point information 808, for which node status (d) is "branching point", is "1", and the connection relationship information (e) of the second node point information 802, for which node status (d) is blank, is "1". This indicates that these node points 802 and 808 have a connection relationship.

The data in such node status (d) and connection relationship information (e) allows explicitly specifying the connection relationship of the nodes at branching points. In terms of spreadsheet data generation, this contributes to realizing efficient data input for each route.

That is, the user inputs sequentially information on the node points, along routes, while referring to an existing isometric drawing. At branching points, the user can input node point information including the connection relationship of node points at branching points, in correct order and for each route, in accordance with a simple and efficient method that involves entering data on node status (d) and on connection relationship information (e). Simple and easy-to-handle spreadsheet data, such as the one illustrated in FIG. 8, can thus be generated in accordance with the above-described simple and efficient data input operation.

In the first to seventh rows in the example of FIG. 8, seven node point informations 801 to 807 on one continuous main route are sequentially inputted along the route. In the eighth to ninth row, there are inputted node point informations 808 to 809 at a first branch route branching from the main route. In the tenth to eleventh row, there are inputted node point informations 810 to 811 at a second branch route branching from the main route.

Meanwhile, data on component type (f1) and face-to-face dimensions (f2) of insertion components is entered piecemeal only for node points at which components are inserted. In FIG. 8, for instance, the component type (f1) of the insertion component in the fourth node point information 804 is "valve", and the face-to-face dimensions (f2) are "300".

The dimensions entered as the cross section size (g2) are not necessarily limited to actual dimensions. The dimensions may be a nominal diameter for tubular components such as pipes or conduits. In such cases, a table containing the relationship between the nominal diameter and the actual diameter may be prepared separately as appended information or internal information. In the case of rectangular cross section components such as cable trays and air conditioning ducts, the components are notated by specifying the width and height thereof.

In FIG. 8, for instance, the "200A" and "25A" entered as cross section size (g2) are nominal diameters according to JIS standards, while "NPS1"" is a nominal diameter according to ANSI standards. When nominal diameters of multiple standards are used, therefore, a table for each standard may be prepared separately.

{Example of Three-Dimensional Data Generation}

Figure 9:
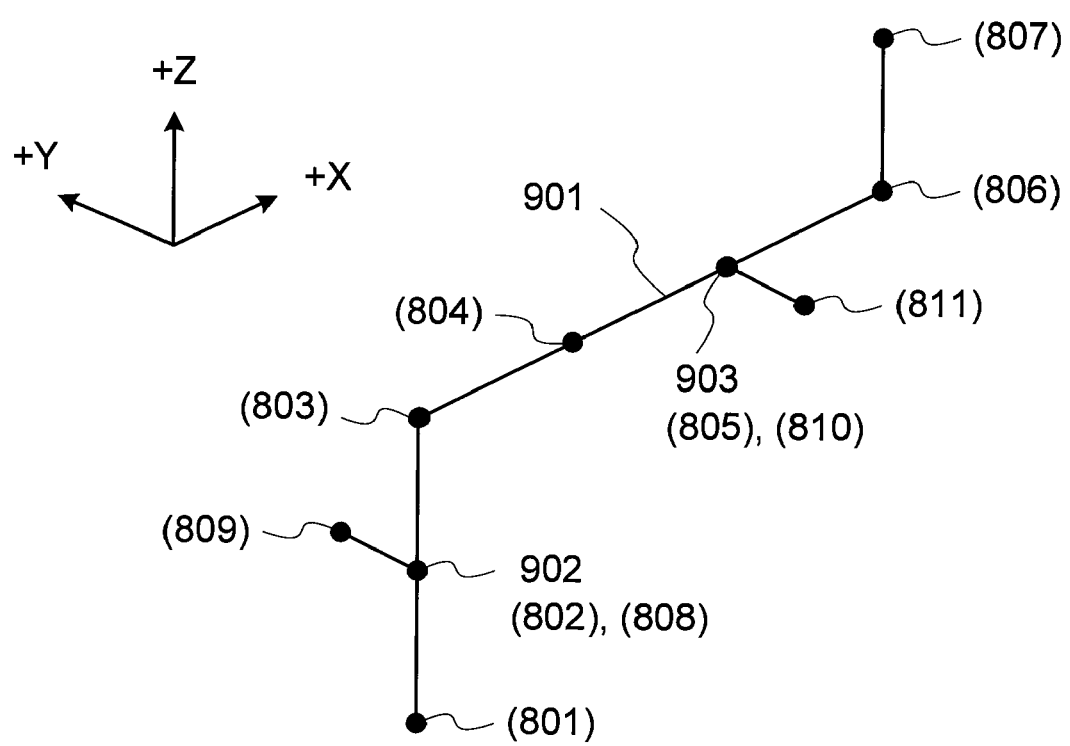
FIG. 9 is a diagram illustrating process status after execution of a node connection process, using the spreadsheet data illustrated in FIG. 8.

FIG. 9 is a diagram illustrating process status after execution of a node connection process by way of node connection unit 1231 of the three-dimensional data conversion unit 123 using the spreadsheet data illustrated in FIG. 8. In the node connection process, as illustrated in FIG. 9, the node points 801 to 811 for each row of the spreadsheet data of FIG. 8 are arranged each in a three-dimensional space on the basis of the coordinate specification information (c) and the three-dimensional spatial coordinates (b) of the node points. The seven node points 801 to 807 having a continuous arrangement relationship on a main route are sequentially connected with line segments 901. The two node points 808 to 809 of the first branch route and the two node points 810 to 811 of the second branch route are also connected with line segments 901.

In FIG. 9, the two node points 802, 808 having assigned thereto the same number "1" of connection relationship information (e) (node points in a specified connection relationship) are represented by one branching point 902 resulting from connecting the points. Similarly, the two node points 805, 810 having assigned thereto the same number "2" of connection relationship information (e) are represented by one branching point 903 resulting from connecting the points.

Figure 10:
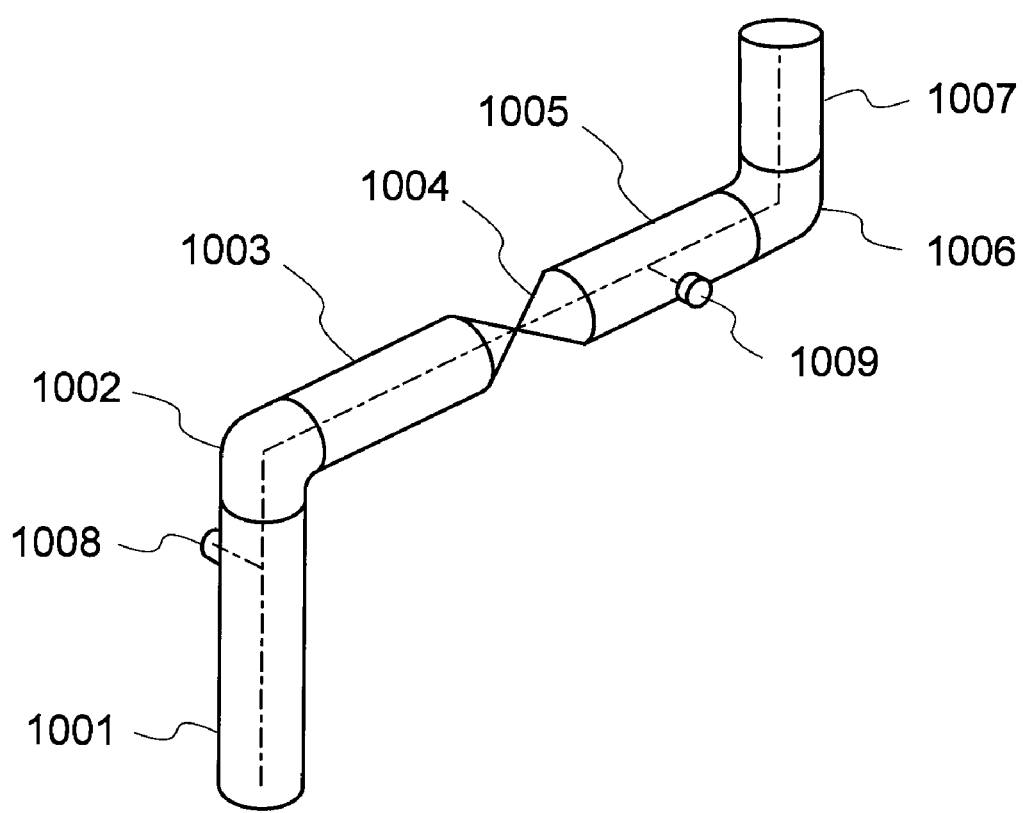
FIG. 10 is a diagram illustrating process status after further execution of a component shaping process and specified component insertion process on the basis of the state after the node connection process illustrated in FIG. 9.

FIG. 10 is a diagram illustrating process status after carrying out a component shaping process and a specified component insertion process by way of the component shaping unit 1232 and the specified component insertion unit 1233 of the three-dimensional data conversion unit 123, on the basis of the state after the node connection process illustrated in FIG. 9, using the data illustrated in FIG. 8. In FIG. 10 there are continuously arranged a straight pipe 1001, a 90 degree elbow 1002, a straight pipe 1003, a valve 1004, a straight pipe 1005, a 90 degree elbow 1006 and a straight pipe 1007. Among the above pipes, a welding bed 1008 and a welding bed 1009 are disposed on the straight pipe 1001 and the straight pipe 1005, respectively.

Such shaping of components is carried out, for instance, as follows. During component shaping through imparting of cross-sectional shape to line segments by the component shaping unit 1232, firstly straight pipes are inserted at straight-line portions, elbows having predetermined face-to-face dimensions are inserted at portions of vector conversion, and straight pipes before and after are trimmed so as to absorb the face-to-face dimensions, and render thereby a smooth component connection.

In FIG. 9, node points 803, 806 at two sites constitute portions at which the vector undergoes 90 degree conversion. Therefore, two 90 degree elbows 1002, 1006 are respectively inserted at the positions of the two node points 803, 806 in FIG. 10. In the spreadsheet data of FIG. 8, the cross-sectional shape (g1) of the pipes is specified as "circular". Accordingly, the cross-sectional shapes of the straight pipes 1001, 1003, 1005 and 1007 and the 90 degree elbows 1002, 1006 are all circular. The straight pipes 1001, 1003, 1005, 1007 before and after the elbows 1002, 1006 are rendered as smooth component connections by being trimmed so as to absorb the face-to-face dimensions of the elbows.

Preferably, it is possible to specify whether or not elbows are to be inserted automatically, such that automatic insertion is carried out only when so specified, and no elbows are inserted when not so specified. For instance, when cable trays or similar electric cable housing components are of small size, the components may be joined through abutting of cut sections, without insertion of smooth elbows. Therefore, being able to specify whether or not elbows are to be inserted automatically allows dealing flexibly with components having specific arrangements. Methods for specifying the presence or absence of elbow automatic insertion may involve confirmation to the user of whether or not elbows are to be inserted automatically, during start of three-dimensional data conversion or during start of the component shaping process. However, automatic insertion of elbows can also be specified beforehand as part of the spreadsheet data.

The specified component insertion process by the specified component insertion unit 1233 is carried out in parallel to or after the process by the component shaping unit 1232 only when the insertion component information (f) is specified. In the spreadsheet data of FIG. 8, "valve" as the component type (f1) and "300" as the face-to-face dimensions (f2) of the insertion component are specified as the insertion component information (f) of the node point 804, which is arranged in FIG. 9. In FIG. 10, accordingly, a valve 1004 having face-to-face dimensions of 300 mm is inserted at the portion of the node point 804 in FIG. 9, in such a manner that the center of the valve coincides with the node point 804. A smooth component connection between the straight pipes 1003, 1005 at both sides of the valve 1004 can be rendered then by trimming half of the face-to-face dimensions of the valve 1004.

{Specific Example of a Method for Inserting Components at Node Points}

Figure 11:
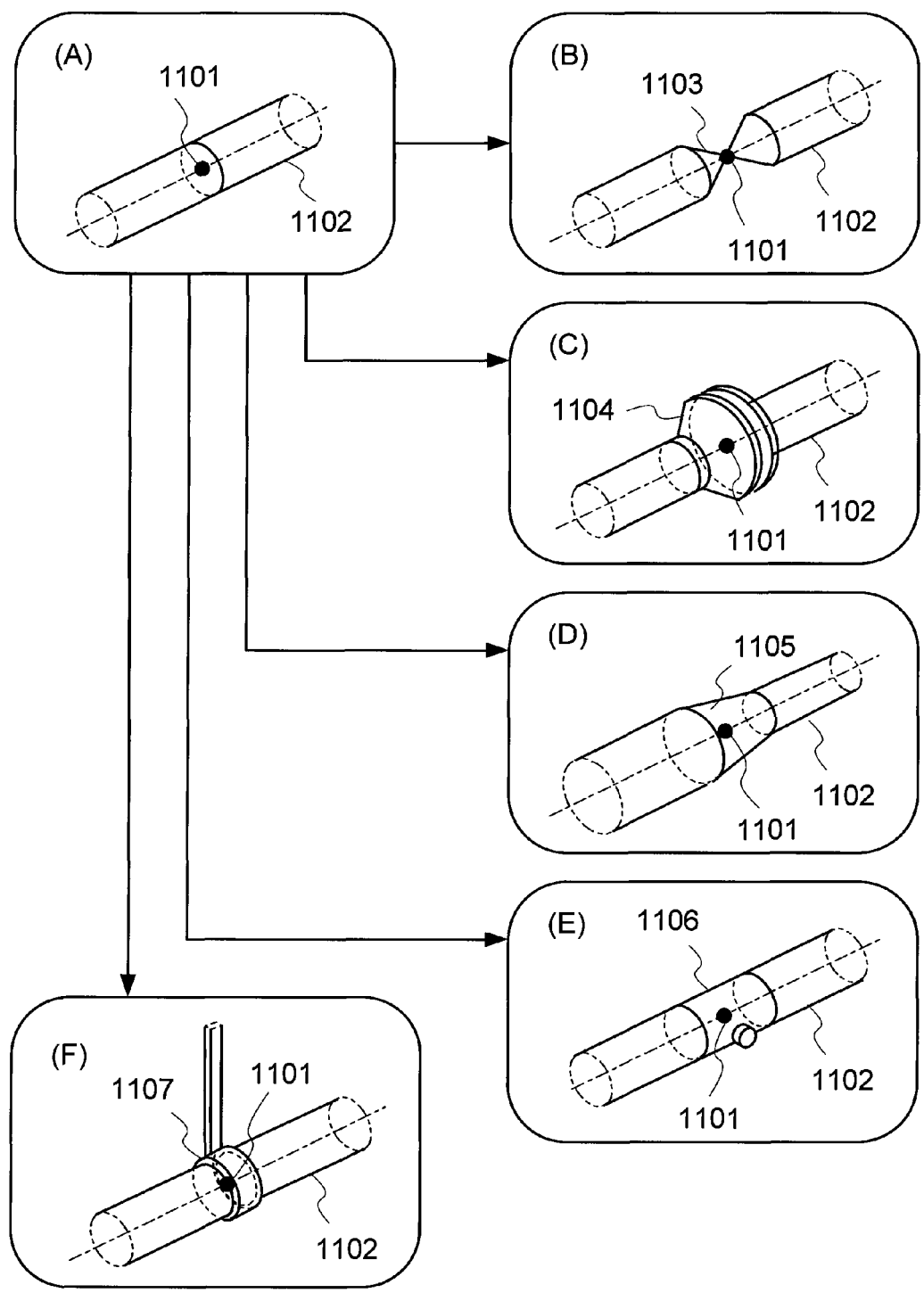
FIG. 11 is a diagram illustrating a specific example of a method of inserting a part at a specified node point by way of a component insertion specification unit of the data edition unit illustrated in FIG. 1 and the specified component insertion unit of the three-dimensional data conversion unit illustrated in FIG. 1.

FIG. 11 is a diagram illustrating a specific example of a method for inserting components at specified node points. In the specified component insertion process by the specified component insertion unit 1233, components of a specified component type having specified face-to-face dimensions are inserted at specific node points on the basis of the component type (f1) and face-to-face dimensions (f2) of a specified insertion component for the specific node points. As regards the insertion positions and insertion methods, a destination straight-line component 1102, having an insertion destination point according to a node point 1101, is parted at the insertion destination point as illustrated in FIG. 11A, and a component having face-to-face dimensions is inserted in between. Fundamentally, the center of the inserted component coincides with the node point, as in the example of FIG. 10.

However, there may be conceivable instances where, for instance, it is not possible to specify the position at which the center of the component is to be fixed, as the component insertion destination, or where there can be specified only the positions at which the inlet or outlet of the component is to be fixed. Preferably, therefore, it should be possible to specify points such as the inlet or outlet of the insertion component, as fixing points corresponding to the node points, also at positions other than the center.

A method for specifying the fixing points of insertion components may involve allowing fixing point information of the insertion components to be specified as part of the insertion component information in the spreadsheet data. Such a method for specifying fixing points of insertion components may be easily carried out by, for instance, adding fixing point information (f3) of the insertion component to the component type (f1) and face-to-face dimensions (f2) of the insertion component, as the insertion component information (f) in the spreadsheet data example of FIG. 8.

By adding the fixing point information (f3) of the insertion component to the component type (f1) and face-to-face dimensions (f2) in the insertion component, as the insertion component information (f), the user can freely specify, by way of the component insertion specification unit 1222 of the data edition unit 122, the fixing points of the insertion components from among center, inlet, outlet and so forth, in addition to the component type (f1) and the face-to-face dimensions (f2) of the insertion components. This allows increasing the degree of freedom of component insertion.

As illustrated in FIG. 11B to FIG. 11F, specific component types of components that are inserted include, for instance, (B) in-line ordinary components 1103 such as valves; (C) fastening components 1104 such as flanges, including interposed gaskets or the like; (D) narrowing-widening components 1105 whose straight-line portions before and after the node point have different sizes; (E) branched components 1106; and support components 1107 whose straight-line portions before and after the node point are not parted but are disposed so as to overlap.

{Specific Example of a Cross-Sectional Shape Specification Method}

FIG. 12 is a diagram illustrating a specific example of a cross-sectional shape specification method. In particular, FIG. 12 is a diagram illustrating types of cross-sectional shapes that can be specified. As illustrated in FIG. 12, cross section IDs (cross section identifiers) such as "circular", "rectangular" and "free" are prepared beforehand in the three-dimensional data generation unit 120 in order to specify three types of cross section, namely a circular cross section 1201, a rectangular cross section 1202 and a free cross section 1203, as cross-sectional shapes that can be specified. A corresponding cross-sectional shape can then be specified simply by selecting one of these cross section IDs.

A cross-sectional shape specification method using such cross section IDs can be easily implemented in that, for instance, the user can selectively specify any of the three cross section IDs "circular", "rectangular" or "free" as the data of cross-sectional shape (g1) in the spreadsheet data example of FIG. 8, by utilizing the function of the cross-sectional shape specification unit 1223 of the data edition unit 122.

In order to specify the dimensions and shape of a free cross section when a free cross section is specified as the cross-sectional shape, the free cross section can be freely constructed by freely combining a plurality of cross-sectional shape elements. Free cross section IDs such as "A" and "B" are assigned to each free cross section in order to individually specify a plurality of different free cross sections. FIG. 13 is a diagram illustrating an example of a free cross section specification method for specifying free cross sections that result from combining a plurality of such cross-sectional shape elements.

A free cross section ID "A" is assigned to a free cross section 1301 illustrated in FIG. 13. The reference numeral 1302 indicates a status whereby the free cross section "A" is deconstructed into a combination of a plurality of cross-sectional shape elements. The free cross section "A" is a combination of three rectangular cross-sectional shape elements 1311 to 1313 having dissimilar dimensions. Element numbers "1" to "3" are assigned to the respective three cross-sectional shape elements. A cross-sectional shape element list 1303 has stored therein, for each cross-sectional shape element, information including free cross section ID, element number, cross-sectional shape, XY coordinates of starting point, width and height.

For the cross-sectional shape element having element number "1", the cross-sectional shape element list 1303 has stored therein information including free cross section ID "A", element number "1", cross-sectional shape "rectangular", XY coordinates of starting point (X,Y)=(5,0), width "20" and height "5". Similarly, the cross-sectional shape element list 1303 has stored therein information including free cross section ID "A", element number "2", cross-sectional shape "rectangular", XY coordinates of starting point (X,Y)=(0,5), width "30" and height "10", for the cross-sectional shape element having element number "2", and free cross section ID "A", element number "3", cross-sectional shape "rectangular", XY coordinates of starting point (X,Y)=(5,15), width "20" and height "5", for the cross-sectional shape element having element number "3".

The cross-sectional shape element list 1303, having stored therein such information defining the individual free cross sections, is held in the spreadsheet database 131 or the three-dimensional data generation unit 120 as detailed information mapped to the cross section information of the spreadsheet data.

The user can freely set a specific cross-sectional shape of free cross section by combining a plurality of cross-sectional shape elements through enablement of free data edition, including new generation, by way of the cross-sectional shape specification unit 1223 of the data edition unit 122, also for the cross-sectional shape element list 1303, as is the case in target component arrangement spreadsheet data.

That is, the user can easily define also a free cross section of complex shape by combining a plurality of cross-sectional shape elements. Assigning a free cross section ID to the definition and saving the free cross section IDs for each free cross section as a cross-sectional shape element list 1303, such as the one illustrated in FIG. 13, allows three-dimensional data having a free cross-sectional shape to be easily generated by simply specifying a cross section ID for a defined cross section.

In such a method for specifying individual free cross sections using free cross section IDs, for instance, the user may be able to further selectively specify a free cross section ID when specifying cross section ID "free" as the data on cross-sectional shape (g1) in the spreadsheet data example of FIG. 8, by utilizing the function of the cross-sectional shape specification unit 1223 of the data edition unit 122. Upon specification of a free cross section after having specified such cross section ID "free" and/or free cross section IDs, free cross section information can be newly generated and existing free cross section information can be edited by enabling specification of a menu for, for instance, new generation of free cross sections and edition of specified free cross sections.

The cross-sectional shape of the cross-sectional shape elements is not limited to rectangular shapes. When the free cross section is curved, the cross-sectional shape elements may have a curved shape such as a semicircular shape or the like. Information on curvature, radii or the like may be supplemented to such curved cross-sectional shape elements.

{Specific Example of a Trajectory Position Specification Method}

Figure 14:
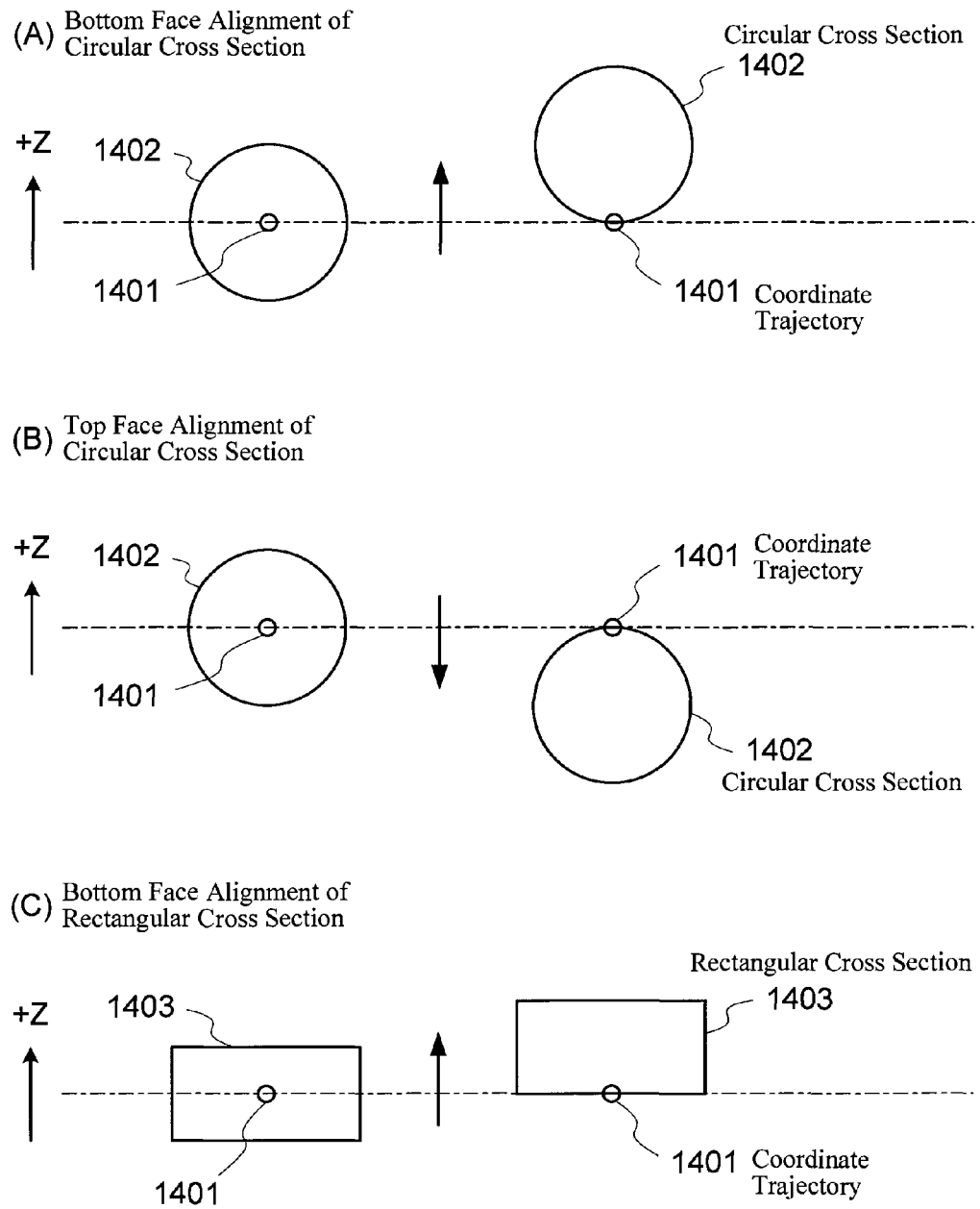
FIG. 14 is a diagram illustrating a specific example of a trajectory position specification method by way of a trajectory position specification unit of the data edition unit illustrated in FIG. 1.

FIG. 14 is a diagram illustrating a specific example of a trajectory position specifying method. As illustrated in FIG. 14, the trajectory position specification unit 1224 of the data edition unit 122 can specify the position of a cross section at which a trajectory of the coordinates is located. FIG. 14A illustrates an instance where the lower face of a circular cross section 1402 is aligned with a coordinate trajectory 1401, FIG. 14B illustrates an instance where the top face of the circular cross section 1402 is aligned with the coordinate trajectory 1401, and FIG. 14C illustrates an instance where the lower face of a rectangular cross section 1403 is aligned with the coordinate trajectory 1401. When no trajectory position is specified, the default position is the position at which the center of the cross section is aligned with the coordinate trajectory.

Figure 15:
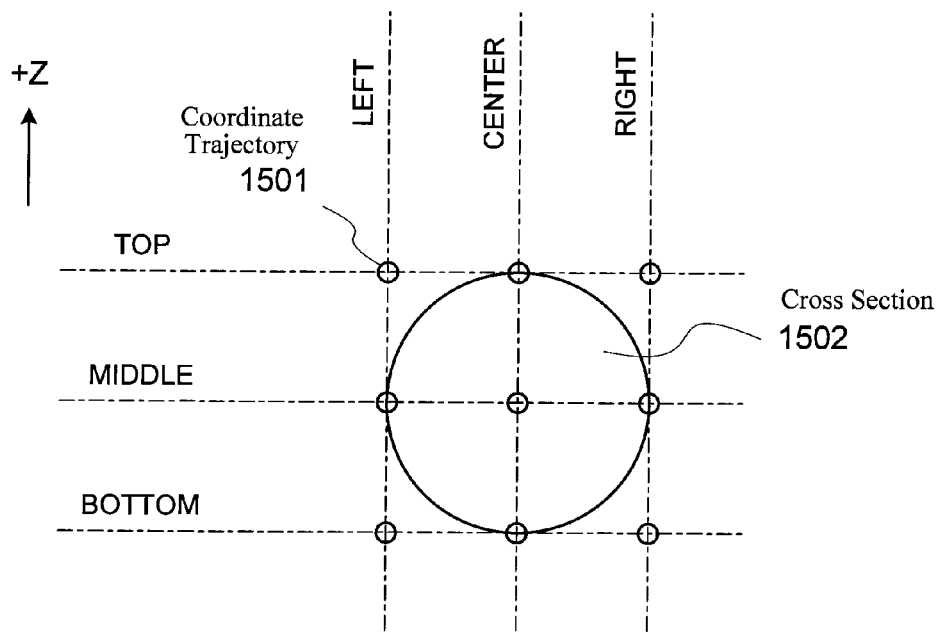
FIG. 15 is a diagram illustrating an example of a specification method in the vertical and left-right direction directions in the trajectory position specification method illustrated in FIG. 14.

The position of the cross section at which the coordinate trajectory lies can be specified not only in the vertical direction, as illustrated in FIG. 14, but also in the vertical and left-right directions, as illustrated in FIG. 15. In FIG. 15 there can be specified a total of nine positions that combine three positions "TOP", "MIDDLE" and "BOTTOM" in the vertical direction, and three positions "LEFT", "CENTER" and "RIGHT" in the left-right direction. When, for instance, "TOP-LEFT" is specified, three-dimensional data can be generated with the top left of a cross section 1502 fixed to a coordinate trajectory 1501, on the basis of the trajectory position information.

Figure 16:
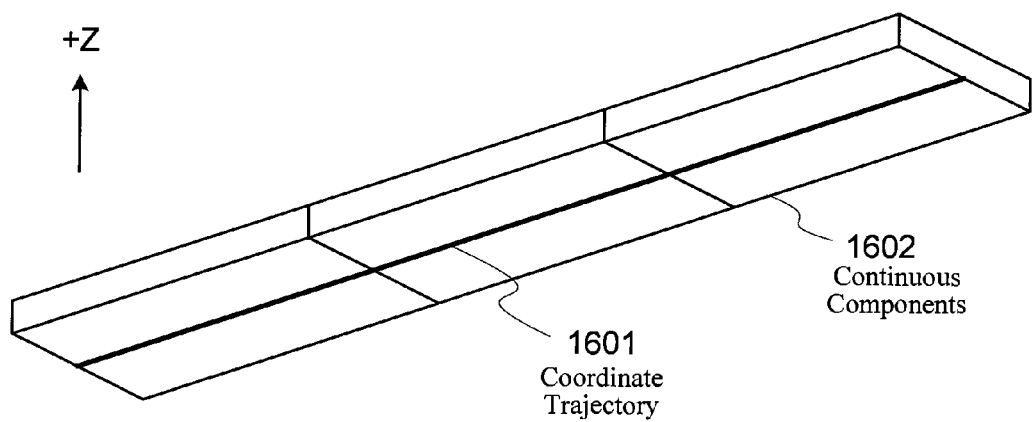
FIG. 16 is a diagram illustrating a three-dimensional image display example upon alignment of a specified position of a cross section relative to a coordinate trajectory in accordance with the trajectory position specification method illustrated in FIG. 14.

The trajectory position fixing unit 1235 of the three-dimensional data conversion unit 123 carries out the process of fixing the specified position of a cross section with respect to a coordinate trajectory, on the basis of trajectory position information. The fixing state of the specified position of the cross section with respect to the coordinate trajectory can be checked by being three-dimensionally displayed on-screen by the three-dimensional data conversion unit 123, as illustrated in FIG. 16. FIG. 16 illustrates an example of on-screen display of a three-dimensional diagram for a case in which the lower face of a continuous component 1602 having a rectangular cross section is aligned with a coordinate trajectory 1601. The graphic encompasses the coordinate trajectory 1601 and the continuous component 1602 having a rectangular cross section, as viewed at an angle from below.

By displaying thus on-screen from the view point according to the trajectory position of the coordinates, a three-dimensional graphic that includes a coordinate trajectory and a component whose specified cross section position is fixed to the coordinate trajectory, the user can three-dimensionally check with ease the position of the cross section at which the coordinate trajectory is located. It is also possible to visualize information such as what route has been measured on-site by modifying the color scheme of the coordinate trajectory depending on whether on-site measurement is carried out or not.

{Example of On-Site Work by a Field Engineer}

As described above, the three-dimensional data generation device of the present embodiment allows generating three-dimensional data easily and efficiently by entering, into a spreadsheet, route data obtained through on-site measurement of component arrangement of elongated components such as pipes, electric cable housing components, air conditioning ducts or the like, at a construction site.

In terms of user workload, the present embodiment elicits the effect of allowing easing the workload of data input into the spreadsheet. To illustrate the workload reducing effect of the present embodiment, a detailed explanation follows next on a specific data input operation generation of spreadsheet data by a field engineer, on the basis of on-site measurements of piping, in an example where piping is connected to power plant equipment.

Firstly, the field engineer measures the piping, through on-site measurement at the construction site. Measurement involves no large-scale scheme, as is the case in point group information acquisition by laser scanning, but easy, piecemeal measurement of various piping parts using a measure, a laser pointer-type rangefinder or the like. The field engineer draws an isometric drawing on the basis of the measurement results. When piping is already designed and on drawing, the field engineer rewrites/amends the isometric drawing.

At this stage, the field engineer will want to validate the results of the measurements in a simple manner, without resorting to a major scheme such as three-dimensional arrangement adjustment CAD. The three-dimensional data generation device of the present embodiment can meet such requirements of the field engineer.

The field engineer, therefore, uses the three-dimensional data generation device of the present embodiment while referring to the generated or revised isometric drawing, to input route data of the piping into the spreadsheet. Specifically, the field engineer carries out interactive data input, via the interface unit 110, using the data edition process of the data edition unit 122 of the three-dimensional data generation unit 120. In the data input procedure, the field engineer tracks the piping on the isometric drawing, in the upstream to downstream direction, and inputs the dimensions notated in the drawing in accordance with the format of the spreadsheet. As an example of the foregoing, a spreadsheet having the format illustrated in FIG. 8 is eventually generated.

A circular cross section, a rectangular cross section or a free cross section can be specified as the cross-sectional shape. Hence, a circular cross section is specified when piping is concerned. If the bore size of the piping is known, that information is inputted as the cross section size. When a table is prepared for each standard such as JIS or ANSI, as described above, the nominal diameter according to the standard may be inputted, even if the actual bore size of the piping is unknown. This allows reducing the workload of the field engineer.

The dimensions from bend to bend are set forth in the isometric drawing, and hence these dimensions may be inputted as it is in the spreadsheet. In the device of the present embodiment, elbow components are automatically inserted at bends. Therefore, the dimensions may be simply inputted without taking into consideration components at bends. The workload of the field engineer can be further reduced as a result.

Strictly speaking, the position of the centerline of piping cannot be measured in a straightforward piping measurement by the field engineer. What the field engineer actually measures is the top face or lower face of piping. In the device of the present embodiment, cross section positions can be specified relative to a trajectory. Hence, the field engineer need not give regard to strict measurement positions, and need only merely input the dimensions set forth in the isometric drawing. The workload of the field engineer can be further reduced as a result.

The spreadsheet data generated as a result of such a simple data input operation is converted easily and efficiently into three-dimensional data by way of the automatic data conversion process of the three-dimensional data conversion unit 123, and is displayed on screen.

The situation of the pipes can be easily checked on the basis of this simple three-dimensional data, generated as described above and displayed on screen. As a result, the field engineer can easily determine whether the measurements and the drawing are valid or not. Measurement errors can be noticed at once when the three-dimensional data differs from actual checks. Therefore, appropriate measures can be taken that involve, for instance, correcting various data by re-measuring sites at which measurement errors are obtained. This allows not only improving the quality of the three-dimensional data, but also improving the quality of the isometric drawing that is used for generating the three-dimensional data.

The generated three-dimensional data can be managed as three-dimensional data that accurately reflects the situation at the construction site, by returning the generated three-dimensional data to the plant design management source. This allows avoiding the problem of erroneous production caused by implementing a different design without knowing the situation on-site. In turn, this allows improving the quality of plant design, thereby easing the design workload.

During three-dimensional data conversion, moreover, color allotment can be modified in accordance with the route of the three-dimensional data measurement portions. The route being measured can then be easily grasped by checking the three-dimensional data. This allows assessing, for instance, the adequacy of the measurements.

Various other attributes can be inputted into the spreadsheet data, for instance the name of the field engineer, measurement date and so forth. Imparting a color scheme to the three-dimensional data in accordance with such information allows monitoring the measurement personnel and progress during three-dimensional data conversion.

Various informations bearing on component type can conceivably be inputted in the actual spreadsheet data. In the case of pipes, for instance, there can be inputted information on whether a heat-insulating material is wrapped around the pipe, and if so, the thickness of the heat-insulating material. In the case of electric cable housing components, there may be inputted a type such as cable tray or the like. If the electric cable housing component is a cable tray, a tray-type cross-sectional shape can be achieved by performing a Boolean computation with the three-dimensional data.

The aggregate tallying of components can be carried out at the same time using the spreadsheet data. For instance, a component count, painted surface area or the like can be grasped on the basis of the measured route.

The above explanation featured an operation example for piping, but the same operation can be employed to generate three-dimensional data in cable trays or conduits, as electric cable housing components, or in air conditioning ducts. In particular, there are elongated components that may be considered for direct on-site installation at large construction sites. The three-dimensional data generation device of the present embodiment is extremely useful in such cases, where it elicits superior results.

By way of the three-dimensional data generation device of the present embodiment, as explained above, three-dimensional data can be generated automatically, easily and efficiently, using existing non-three-dimensional data in the form of isometric drawings or the like, without resorting to three-dimensional arrangement adjustment CAD, when it is necessary to check three-dimensional information on the arrangement of elongated components such as pipes, electric cable housing components, air conditioning ducts or the like. Thus, it is possible to easily generate three-dimensional data on components measured at the actual construction site, so that the plant design burden can be eased accordingly. This contributes to realizing higher-quality plant design and manufacture.

OTHER EMBODIMENTS

The present invention is not limited to the above-described embodiment, and can accommodate numerous modifications without departing from the scope thereof. The configuration of the device illustrated in the drawings is merely an example illustrating the minimum required functional configuration for realizing the present invention. Thus, the specific system configuration, including peripherals, the hardware configuration and the software configuration can be appropriately selected. Likewise, the flowcharts illustrated in the drawings illustrate merely examples of the process flow of the device of the present invention. The specific process flow can be appropriately modified in accordance with, for instance, the device configuration and the data that is used.

For instance, the explanation of the embodiment above involved a case where, to start the three-dimensional data generation process, a start instruction by the user is supported by a GUI screen, and a series of three-dimensional data generation processes is initiated using the inputted start instruction as a trigger. However, the three-dimensional data generation processes may also start automatically, without user intervention, through batch processing contingent on acquisition of new spreadsheet data.

In batch processing, for instance, the three-dimensional data generation process may be initiated automatically upon acquisition of spreadsheet data. Alternatively, the three-dimensional data generation process may be initiated automatically upon detection of new spreadsheet data as a result of periodic checking on spreadsheet data acquisition.

Also, various display specifications or display modifications may be carried out during the three-dimensional data generation process, or for the three-dimensional data after being displayed on screen, in accordance with the application of the check. For instance, there may be specified or modified data to be colored, or there may be specified of modified the display direction of the three-dimensional data.

The procedure explained in the above-described embodiment involves repeating the spreadsheet data edition process and the three-dimensional data conversion process. However, this is merely an example, and the data edition process and the three-dimensional data conversion process may be carried out wholly separately from each other. When part of the spreadsheet data is updated in the embodiment above, moreover, the explained procedure involves updating only the corresponding part of the existing three-dimensional data. However, a series of three-dimensional data conversion processes, such as a node connection process can be automatically initiated also, as is the case during acquisition of new spreadsheet data, when only part of the spreadsheet data is updated.

The format of the spreadsheet depicted in FIG. 8 is merely an illustrative example. The spreadsheet used in the present invention, and the various data formats associated therewith, such as the various tables, can be freely selected in accordance with the information included in the spreadsheet, the sequence of the information, and the intended application.

This application claims priority from Japanese Patent Application 2008-263277, filed Oct. 9, 2008, which is incorporated herein by reference in its entirety.

The invention claimed is:

1. A three-dimensional data generation device for generating, using a computer, three-dimensional data that represents a continuous arrangement of target components in a three-dimensional space, wherein the computer comprises:
    an interface unit for issuing various instructions and inputting and outputting data;
    a three-dimensional data generation unit for generating target component arrangement three-dimensional data by processing target component arrangement spreadsheet data where a spreadsheet represents information on each node point comprising information on a plurality of items that include three-dimensional spatial coordinates, as information relating to a plurality of node points denoting direction conversion points, connection points, branching points, end points or other characteristic points, on a continuous arrangement route of target components; and
    a storage unit for storing target component arrangement spreadsheet data acquired via the interface unit or other unit, and target component arrangement three-dimensional data obtained as a result of processing by the three-dimensional data generation unit;
    wherein the three-dimensional data generation unit has:
    a data edition unit for reading target component arrangement spreadsheet data stored in the storage unit and then editing the spreadsheet data by performing data edition on information on the plurality of items in the read spreadsheet data, in response to an edition instruction or data input from the interface unit;
    a three-dimensional data conversion unit, on the basis of spreadsheet data acquired as a result of processing by the data edition unit, for arranging the node points in a three-dimensional space, connecting node points having a predetermined relationship using line segments, and imparting cross-sectional shapes to the connected line segments, to carry out thereby conversion into target component arrangement three-dimensional data; and
    a three-dimensional data management unit for storing the target component arrangement three-dimensional data obtained by the three-dimensional data conversion unit in the storage unit, in a format readable by three-dimensional CAD or three-dimensional review system, and outputting the data in response to an output instruction from the interface unit,
    wherein the data edition unit has a cross-sectional shape specification unit which generates the cross section information specifying a free cross section, the free cross section being a combination of cross-sectional shapes which are respectively selected from a plurality of cross-sectional shapes including circular cross section and rectangular cross section by using the interface unit and adds the cross section information as one piece of information on the plurality of items in the spreadsheet data,
    wherein the three-dimensional data conversion unit has a specified cross-sectional shape imparting unit which imparts the shape of the free cross section specified by the cross section information to the component of the node point based on the spreadsheet data.

2. The three-dimensional data generation device according to claim 1,
    wherein the three-dimensional data conversion unit has:
    a node connection unit for arranging the node points in a three-dimensional space, and connecting node points having a predetermined relationship using line segments;
    a component shaping unit for arranging straight-line components by imparting cross-sectional shape to the straight-line portions of connected line segments, and for arranging bent components having cross-sectional shape at portions of vector change, to yield continuous components; and a specified component insertion unit for inserting specified components at specified node points.

3. The three-dimensional data generation device according to claim 2, wherein:
the spreadsheet data includes as the information on a plurality of items, connection relationship information specifying a connection relationship between the node point and another node point; and
the node connection unit, on the basis of the three-dimensional spatial coordinates and the connection relationship information, arranges the node points in a three-dimensional space, and then sequentially connects with line segments those node points having a continuous arrangement relationship, and connects with line segments or points the node points having a specified connection relationship, to generate a diagram that depicts the routes of the target component arrangement.

4. The three-dimensional data generation device according to claim 2, wherein:
the component shaping unit, on the basis of a default cross-sectional shape set up beforehand, arranges firstly straight-line components by imparting a cross-sectional shape to straight-line portions, and next an elbow having the same cross-sectional shape at portions of vector change, subsequently, trims the straight-line portions before and behind the elbow, to render a smooth component connection; and
the default cross-sectional shape is a circular cross-sectional shape or rectangular cross-sectional shape.

5. The three-dimensional data generation device according to claim 2, wherein:
the spreadsheet data includes as the information on a plurality of items, insertion component information specifying component type and face-to-face dimensions of a component when it is inserted at the node point; and
the specified component insertion unit, when insertion component information on a node point is included in the spreadsheet data, inserts the component specified in the insertion component information at the node point for which insertion component information is contained in the spreadsheet data, with specified face-to-face dimensions.

6. The three-dimensional data generation device according to claim 5, wherein:
the insertion component information on a node point included in the spreadsheet data, allows a user to selectively specify the center point or end paint of the component to be inserted at the straight-line portions of the target component arrangement, as fixing point corresponding to the node point; and
the specified component insertion unit, when insertion component information on a node point is included in the spreadsheet data, parts a destination straight-line portion on the basis of the fixing point specified in the insertion component information, and inserts the specified component between the parted portions with specified face-to-face dimensions.

7. The three-dimensional data generation device according to claim 2, wherein:
the spreadsheet data includes as the information on a plurality of items,
three-dimensional spatial coordinates of the node point;
connection relationship information specifying a connection relationship between the node point and another node point;
insertion component information specifying component type and face-to-face dimensions of a component when it is inserted at the node point;
cross section information specifying the dimensions and shape of the cross section of the node point; and
trajectory position information specifying the position of the cross section at which the coordinate trajectory of the node point is located, and
the data edition unit has:
a component insertion specification unit for specifying or modifying component type and face-to-face dimensions of the component to be inserted at the node point by processing the insertion component information;
the cross-sectional shape specification unit for specifying or modifying the dimensions and shape of the cross section of the node point by processing the cross section information; and
a trajectory position specification unit for specifying or modifying the position of the cross section at which the trajectory of the coordinates of the node point is located by processing the trajectory position information, and
the specified component insertion unit, on the basis of the insertion component information, inserts the specified component at the specified node point with specified face-to-face dimensions, and
the three-dimensional data conversion unit has:
the specified cross-sectional shape imparting unit for imparting specified dimensions and shape to the cross section of the node point, on the basis of the cross section information; and
a trajectory position fixing unit for fixing a specified position of the cross section relative to the trajectory of the coordinates of the node point, on the basis of the trajectory position information.

8. The three-dimensional data generation device according to claim 7, wherein:
as data used for the cross section information, cross section identifiers that respectively denote a plurality of cross-sectional shapes including circular cross section, rectangular cross section and free cross section, are prepared beforehand;
the cross-sectional shape specification unit can selectively specify the cross-sectional shape of the node point by selectively specifying the cross section identifiers; and
the specified cross-sectional shape imparting unit imparts to the component of the node point, specified cross-sectional dimensions and cross-sectional shape which is denoted by a cross section identifier specified in the cross section information of the node point.

9. The three-dimensional data generation device according to claim 8, wherein:
as data used for the cross section information, for each of free cross sections which have cross-sectional shapes different from each other, free cross section information on a combination of a plurality of cross-sectional shape elements that construct the free cross section, is set up in correspondence with a free cross section identifier denoting it;
the cross-sectional shape specification unit can freely specify the free cross section of the node point by selectively combining a plurality of cross-sectional shape elements; and
the specified cross-sectional shape imparting unit imparts to the component of the node point, a free cross section which is constructed from a combination of a plurality of cross-sectional shape elements and denoted by a free cross section identifier specified in the cross section information of the node point.

10. The three-dimensional data generation device according to claim 9, wherein:
in the free cross section information, individual cross-sectional shape elements are defined by cross-sectional shape, two-dimensional coordinates, width and height; and
the cross-sectional shape specification unit can freely specify the definitions of individual cross-sectional shape elements.

11. The three-dimensional data generation device according to claim 7, wherein:
the trajectory position specification unit, by processing the trajectory position information of the node point, can freely specify in the vertical and left-right directions, the position of the cross section at which the trajectory of the coordinates of the node point is located; and
the three-dimensional data conversion unit causes the interface unit to on-screen and three-dimensionally display three-dimensional data from the viewpoint according to the trajectory position of the coordinates, the three-dimensional data being obtained as a result of fixing a specified position of the cross section relative to the trajectory of the coordinates, on the basis of the trajectory position information, by the trajectory position fixing unit.

12. The three-dimensional data generation device according to claim 1, wherein:
the spreadsheet data includes as the information on a plurality of items, as follows:
(a) component name or component identifier specifying the component at the node point;
(b) three-dimensional spatial coordinates of the node point;
(c) coordinate specification information for specifying whether the three-dimensional spatial coordinates of the node point are absolute coordinates or relative coordinates;
(d) node status information specifying whether the status of the node is that of a branching point, an end point, or a characteristic point other than the foregoing;
(e) connection relationship information specifying a connection relationship between the node point and another node point;
(f) insertion component information specifying component type and face-to-face dimensions of a component when it is inserted at the node point;
(g) cross section information specifying the dimensions and shape of the cross section of the node point; and
(h) trajectory position information specifying the position of the cross section at which the coordinate trajectory of the node point is located.

13. A three-dimensional data generation method for generating, using a computer, three-dimensional data that represents a continuous arrangement of target components in a three-dimensional space, wherein the computer comprises:
an interface unit for issuing various instructions and inputting and outputting data;
a three-dimensional data generation unit for generating target component arrangement three-dimensional data by processing target component arrangement spreadsheet data where a spreadsheet represents information on each node point comprising information on a plurality of items that include three-dimensional spatial coordinates, as information relating to a plurality of node points denoting direction conversion points, connection points, branching points, end points or other characteristic points, on a continuous arrangement route of target components; and
a storage unit for storing target component arrangement spreadsheet data acquired via the interface unit or other unit, and target component arrangement three-dimensional data obtained as a result of processing by the three-dimensional data generation unit;
wherein the three-dimensional data generation unit performs:
a data edition process for reading target component arrangement spreadsheet data stored in the storage unit and then editing the spreadsheet data by performing data edition on information on the plurality of items in the read spreadsheet data, in response to an edition instruction or data input from the interface unit;
a three-dimensional data conversion process, on the basis of spreadsheet data acquired as a result of the data edition process, for arranging the node points in a three-dimensional space, connecting node points having a predetermined relationship using line segments, and imparting cross-sectional shapes to the connected line segments, to carry out thereby conversion into target component arrangement three-dimensional data; and
a three-dimensional data management process for storing the target component arrangement three-dimensional data obtained by the three-dimensional data conversion process in the storage unit, in a format readable by three-dimensional CAD or three-dimensional review system, and outputting the data in response to an output instruction from the interface unit,
wherein, in the data edition process, the cross section information is generated specifying a free cross section, the free cross section being a combination of cross-sectional shapes which are respectively selected from a plurality of cross-sectional shapes including circular cross section and rectangular cross section by using the interface unit and adding the cross section information as one piece of information on the plurality of items in the spreadsheet data,
wherein, in the three-dimensional data conversion process, the shape of the free cross section specified by the cross section information is imparted to the component of the node point based on the spreadsheet data.

14. A non-transitory computer-accessible storage medium storing a three-dimensional data generation program for generating, three-dimensional data that represents a continuous arrangement of target components in a three-dimensional space, wherein the computer comprises:
an interface unit for issuing various instructions and inputting and outputting data;
a three-dimensional data generation unit for generating target component arrangement three-dimensional data by processing target component arrangement spreadsheet data where a spreadsheet represents information on each node point comprising information on a plurality of items that include three-dimensional spatial coordinates, as information relating to a plurality of node points denoting direction conversion points, connection points, branching points, end points or other characteristic points, on a continuous arrangement route of target components; and
a storage unit for storing target component arrangement spreadsheet data acquired via the interface unit or other unit, and target component arrangement three-dimensional data obtained as a result of processing by the three-dimensional data generation unit;

wherein the program, when executed by the computer, causes the three-dimensional data generation unit to perform:
a data edition process for reading target component arrangement spreadsheet data stored in the storage unit and then editing the spreadsheet data by performing data edition on information on the plurality of items in the read spreadsheet data, in response to an edition instruction or data input from the interface unit;
a three-dimensional data conversion process, on the basis of spreadsheet data acquired as a result of the data edition process, for arranging the node points in a three-dimensional space, connecting node points having a predetermined relationship using line segments, and imparting cross-sectional shapes to the connected line segments, to carry out thereby conversion into target component arrangement three-dimensional data; and
a three-dimensional data management process for storing the target component arrangement three-dimensional data obtained by the three-dimensional data conversion process in the storage unit, in a format readable by three-dimensional CAD or three-dimensional review system, and outputting the data in response to an output instruction from the interface unit,
wherein, in the data edition process, the cross section information is generated specifying a free cross section, the free cross section being a combination of cross-sectional shapes which are respectively selected from a plurality of cross-sectional shapes including circular cross section and rectangular cross section by using the interface unit and adding the cross section information as one piece of information on the plurality of items in the spreadsheet data,
wherein, in the three-dimensional data conversion process, the shape of the free cross section specified by the cross section information is imparted to the component of the node point based on the spreadsheet data.

* * * * *